United States Patent
Yamamoto et al.

(10) Patent No.: US 7,792,639 B2
(45) Date of Patent: Sep. 7, 2010

(54) HOST BASED SATELLITE POSITIONING SYSTEMS

(75) Inventors: Clifford Yamamoto, Gardena, CA (US);
Sebastian Nonis, Carson, CA (US);
Ashutosh Pande, San Jose, CA (US);
Nikola Bulatovic, Santa Clara, CA (US);
Stefan Witanis, Sunnyvale, CA (US)

(73) Assignee: SiRF Technology Inc., San Jose, CA (US)

( * ) Notice: Subject to any disclaimer, the term of this patent is extended or adjusted under 35 U.S.C. 154(b) by 0 days.

(21) Appl. No.: 11/149,438

(22) Filed: Jun. 6, 2005

(65) Prior Publication Data

US 2006/0287820 A1    Dec. 21, 2006

Related U.S. Application Data

(63) Continuation of application No. 10/269,914, filed on Oct. 10, 2002, now Pat. No. 7,043,363.

(51) Int. Cl.
*G01C 21/00* (2006.01)
*G08G 1/123* (2006.01)

(52) U.S. Cl. .............. 701/213; 701/200; 701/201; 701/202; 701/207; 701/209; 701/214; 701/216; 701/218; 701/222; 340/988; 340/539.13; 342/352; 342/357.01; 342/357.06; 342/357.12; 342/357.15; 455/456.1; 455/456.2; 455/456.3; 455/457

(58) Field of Classification Search .......... 701/200–202, 701/207, 209, 213, 214, 216, 218, 222; 340/988–993, 340/531.1, 539.11, 539.13, 572.1; 342/352, 342/357.01, 357.06, 357.09, 357.12, 357.15; 455/456.1–457
See application file for complete search history.

(56) References Cited

U.S. PATENT DOCUMENTS

| | | | | |
|---|---|---|---|---|
| 5,528,248 A * | 6/1996 | Steiner et al. | ......... | 342/357.06 |
| 5,589,835 A * | 12/1996 | Gildea et al. | ......... | 342/357.03 |
| 5,832,247 A * | 11/1998 | Gildea et al. | ......... | 710/306 |
| 6,021,372 A * | 2/2000 | Harrington | ......... | 701/209 |
| 6,148,261 A * | 11/2000 | Obradovich et al. | ......... | 701/208 |
| 6,212,474 B1 * | 4/2001 | Fowler et al. | ......... | 701/211 |
| 6,266,612 B1 * | 7/2001 | Dussell et al. | ......... | 701/207 |
| 6,411,892 B1 | 6/2002 | van Diggelen | | |
| 6,417,801 B1 | 7/2002 | van Diggelen | | |
| 6,429,814 B1 | 8/2002 | van Diggelen et al. | | |
| 6,453,237 B1 | 9/2002 | Fuchs et al. | | |
| 6,484,097 B2 | 11/2002 | Fuchs et al. | | |
| 6,487,499 B1 | 11/2002 | Fuchs et al. | | |
| 6,510,387 B2 | 1/2003 | Fuchs et al. | | |
| 6,587,782 B1 * | 7/2003 | Nocek et al. | ......... | 701/200 |
| 6,662,103 B1 * | 12/2003 | Skolnick et al. | ......... | 701/207 |
| 6,727,920 B1 * | 4/2004 | Vineyard, Jr. et al. | ......... | 715/810 |
| 7,043,363 B2 * | 5/2006 | Yamamoto et al. | ......... | 701/213 |

(Continued)

*Primary Examiner*—Jack Keith
*Assistant Examiner*—Chuong P Nguyen
(74) *Attorney, Agent, or Firm*—RatnerPrestia

(57) ABSTRACT

Methods and systems consistent with the present invention provide a host based positioning system. The host based positioning system includes a tracker hardware interface that connects to a dedicated hardware space vehicle tracker. The tracker hardware interface receives positioning information from the space vehicle tracker. The host based positioning system also includes a memory that includes a GPS library having a user interface, a tracker interface, and an operating system interface. A processor runs functions provided by the interfaces.

6 Claims, 6 Drawing Sheets

U.S. PATENT DOCUMENTS

2004/0183673 A1* 9/2004 Nageli .................... 340/539.13
2004/0189517 A1* 9/2004 Pande et al. ............ 342/357.06
2005/0134503 A1* 6/2005 Colley et al. ........... 342/357.09

* cited by examiner

600

HOST BASED SATELLITE POSITIONING SYSTEMS

CROSS-REFERENCE TO RELATED APPLICATIONS

This application is a continuation of U.S. patent application Ser. No. 10/269,914, entitled HOST BASED SATELLITE POSITIONING SYSTEMS, filed on Oct. 10, 2002, that issued as U.S. Pat. No. 7,043,363 on May 9, 2006, which was related to U.S. patent application Ser. No. 10/269,105, titled, "LAYERED HOST BASED SATELLITE POSITIONING SOLUTIONS", filed on Oct. 10, 2002, and U.S. patent application Ser. No. 10/269,104, titled, "NAVIGATION PROCESSING IN HOST BASED SATELLITE POSITIONING SOLUTIONS", filed Oct. 10, 2002, both of which were incorporated by reference in their entirety and which are also incorporated by reference herein.

BACKGROUND OF THE INVENTION

1. Field of the Invention

This invention relates to satellite positioning systems. In particular, this invention relates to satellite positioning systems implemented utilizing the processing power of a host in communication with a hardware tracker.

2. Related Art

The worldwide utilization of wireless devices such as two-way radios, pagers, portable televisions, personal communication system ("PCS"), personal digital assistants ("PDAs") cellular telephones (also known a "mobile phones"), Bluetooth, satellite radio receivers and Satellite Positioning Systems ("SPS") such as Global Positioning Systems ("GPS"), also known as NAVSTAR, is growing at a rapid pace. Current trends are calling for the incorporation of SPS services into a broad range of electronic devices and systems, including Personal Digital Assistants (PDAs), cellular telephones, portable computers, automobiles, and the like. At the same time, manufacturers constantly strive to reduce costs and produce the most cost-attractive product possible for consumers.

In the past, providing a SPS solution often involved expensive dedicated SPS signal reception and processing hardware, as well as dedicated post processing hardware for resolving location measurements, displaying location coordinates, updating map displays, and the like. However, given the rapid growth in speed, sophistication, and processing power of the host microprocessors present in the host device (e.g., in a cellular telephone or automobile), the possibility exists for allowing the host microprocessor to bear the burden not only of running its regular applications, but also to operate as part of the SPS solution. Such an approach is presented in U.S. Pat. No. 6,430,503, titled "Distributed GPS Navigation System," issued to Paul W. McBurney et al., the entirety of which is incorporated herein by reference.

As noted above, however, there is a strong push toward incorporating SPS solutions in many electronic devices designed by numerous manufacturers. Of course, each device varies considerably in architecture, operating system, hardware interfaces, and the like. Prior SPS solutions did not provide the flexibility that allowed the solutions to be adapted to a wide range of electronic devices. Instead, expensive customized solutions were needed for each device, thereby undesirably increasing costs and delaying the introduction of SPS services into a wide range of devices.

Therefore, a need exists for implementations of SPS solutions that overcome the problems noted above and others previously experienced.

SUMMARY

Methods and systems consistent with an invention of a host based SPS solution are disclosed. The SPS solution is implemented in a convenient library form that is flexible and extensible, and that may adapt to meet the needs of many different hardware platforms. As a result, a wide variety of electronic devices may incorporate SPS functionality with less expense utilizing less development time.

In one example implementation, a host based SPS system may include a host processing system that connects through a tracker hardware interface to a dedicated hardware space vehicle tracker. The host processing system may also include a memory that includes a SPS library having a user interface, positioning engine, a tracker interface and an operating system interface. A processor in the host processing system runs the positioning engine and the functions provided by the interfaces.

The tracker hardware interface receives positioning information from the space vehicle tracker. Through functions in the tracker interface, the positioning information is communicated to the positioning engine. In turn, the positioning engine may determine a position and communicate the position to a user application through functions provided in the user interface.

Other apparatus, systems, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Reference will now be made in detail to an implementation in accordance with methods, systems, and products consistent with the present invention as illustrated in the accompanying drawings. The same reference numbers may be used throughout the drawings and the following description to refer to the same or like parts.

A typical satellite positioning system ("SPS") system has approximately 12 satellites that may be visible at any one time to a wireless device. SPS means any system utilizing satellites and/or land-based communications devices for providing or enabling the determination of a location of the wireless device on the earth, for example but not limited to: the global positioning system ("GPS") known as NAVSTAR, GLONASS, LORAN, Shoran, Decca, or TACAN. Although many of the interface functions below make reference to GPS, those functions are not limited to use with GPS, but, generally, are equally applicable in other SPS environments.

Figure 1:
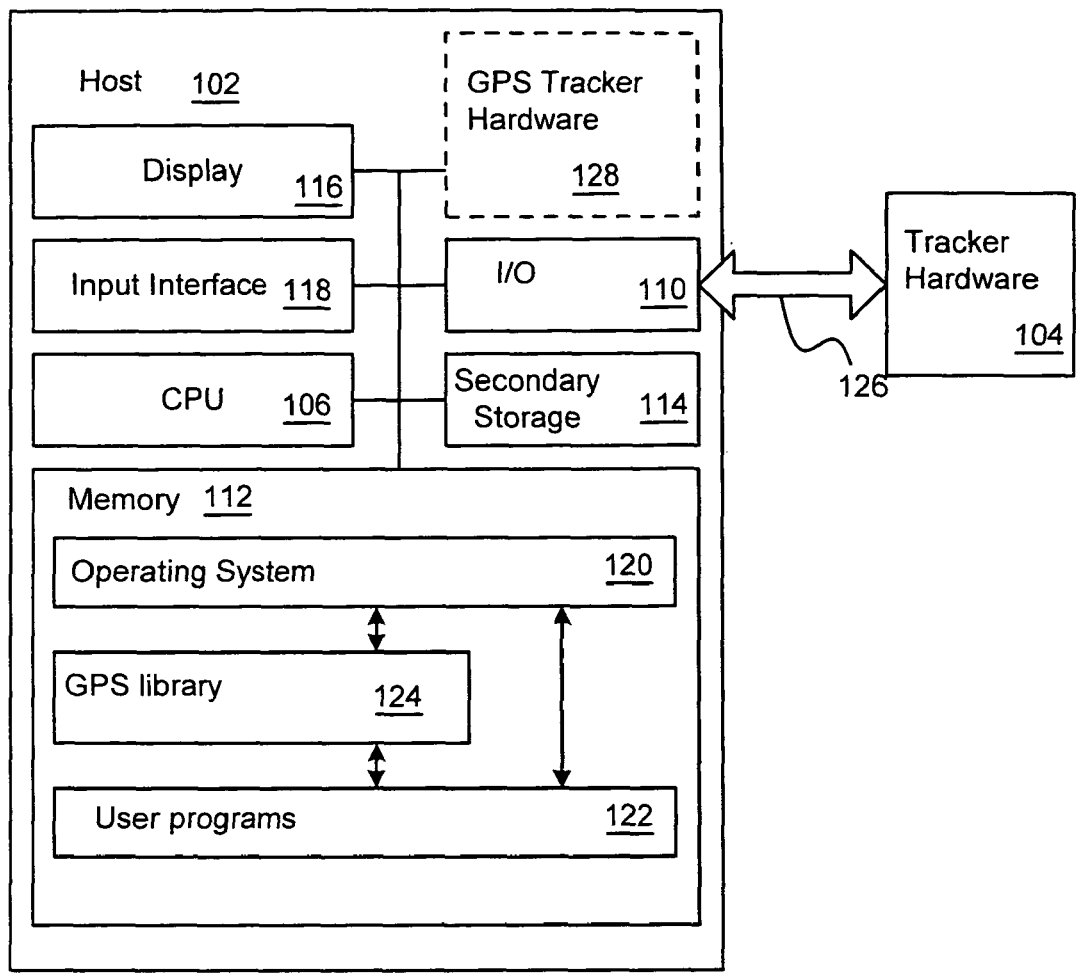
FIG. 1 illustrates a detailed block diagram of one example of a positioning systems implemented as a host based SPS solution.

FIG. 1 depicts a block diagram of a positioning system 100 suitable for practicing methods and implementing systems consistent with the present invention. The positioning system 100 includes a host 102 and tracker hardware 104. The host 102 includes a central processing unit ("CPU") 106, a hardware tracker interface 110, and a memory 112. The host 102 also includes a secondary storage device 114 (e.g., generally non-volatile memory such as a magnetic disk, flash memory, optical storage, and the like), and a display 116, and an input interface 118 (e.g., a mouse, keyboard, and the like).

An operating system 120 (e.g., Windows CE, QNX, Palm OS, UNIX, Linux, Windows 2000, NT, XP, or the like) runs in the memory 112. As will be explained in more detail below, a user program 122 communicates with a SPS library 124 and the operating system 120. The user program 122 thereby receives position information from the GPS library, and may also communicate commands to the SPS library. The user program 122 may be any program that utilizes positioning information, including, as examples, a mapping program, course charter, location aid, and the like.

The host 102 connects through the hardware tracker interface 110 and the interface connection 126 to the tracker hardware 104. The hardware tracker interface 110 may be virtually any type of data transfer interface (as examples, a serial, parallel, compact flash, PC Card, or network interface). The interface connection 126 may then be, as examples, a serial cable, parallel cable, or network cable, and may optionally be wireless. In one implementation, the hardware tracker interface 110 is an RS232 port running at 38,400 bps, N-8-1 that communicates up to 2 KB of data per second between the host 102 and the tracker hardware 104.

In other implementations, the tracker hardware (as illustrated by the reference numeral 128) is more closely incorporated into the host 102. Thus, rather than connecting to the host 102 through the interface connection 126, for example, the tracker hardware 128 may be directly coupled to the host 102 address, data, and control buses. As will be explained in more detail below, the host 102 receives and processes navigation information from the hardware tracker 104, 128 in order to provide the user programs 122 with position information.

Although aspects of the present invention are depicted as being stored in memory 112, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of positioning system 100 are described, one skilled in the art will appreciate that a positioning system suitable for use with methods, systems, and articles of manufacture consistent with the present invention may contain additional or different components. For example, the CPU 106 may be a microprocessor, microcontroller, application specific integrated circuit ("ASIC"), discrete or a combination of other types of circuits acting as a central processing unit. The memory 112 may be RAM, DRAM, SDRAM, or any other type of read/writeable memory.

Figure 2:
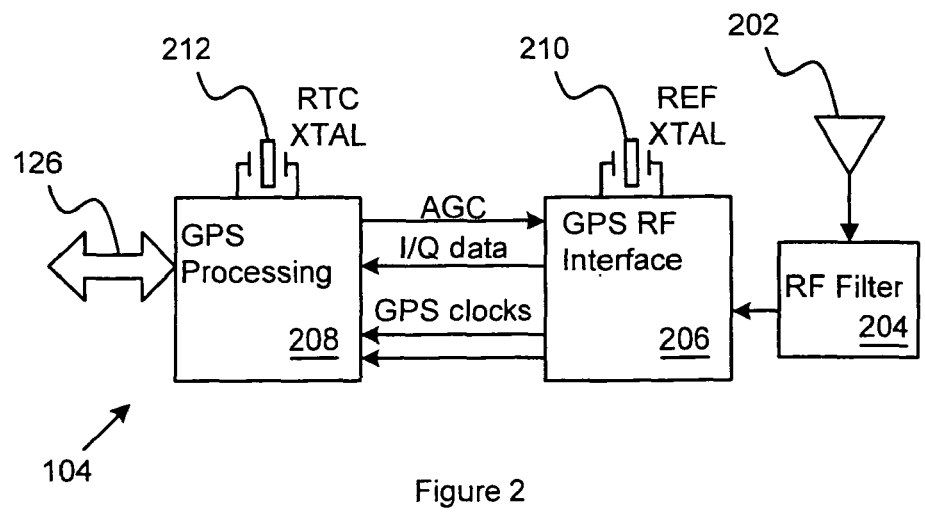
FIG. 2 illustrates a hardware tracker that communicates with the positioning system shown in FIG. 1.

Turning next to FIG. 2, that figure shows one example of an implementation of the tracker hardware 104. The tracker hardware 104 acquires and tracks SPS satellites and sends raw measurement data to the host 102 for position calculation. To that end, the tracker hardware 104 includes an antenna 202 for receiving SPS satellite signals and a radio frequency ("RF") filter 204 for passing the signals to the RF interface circuit 206. The RF interface circuit 206 processes the signals, produces 2-bit Inphase and Quadrature ("I/Q") signals and recovers SPS clocks. The RF interface circuit 206 provides the I/Q signals and SPS clocks to the location processing circuit 208 for digital processing. A reference frequency source 210 (e.g., a crystal oscillator) provides a reference clock for the RF interface circuit 206, while the optional real time clock ("RTC") source 212 provides a reference clock for the location processing circuit 208.

The tracker hardware 104 may be implemented with components available from SiRF Technology, Inc. of San Jose Calif. For example, the RF interface circuit 206 may be implemented as a GRF2i/LP integrated circuit. The location processing circuit may be implemented, as examples, as a GSP2t integrated circuit or GSP2e integrated circuit. The tracker hardware 104 minimizes the overhead on the host 102 and operating system 120 by keeping low the maximum transmission rate of raw measurements to the host 102 (e.g., one measurement per second).

Figure 3:
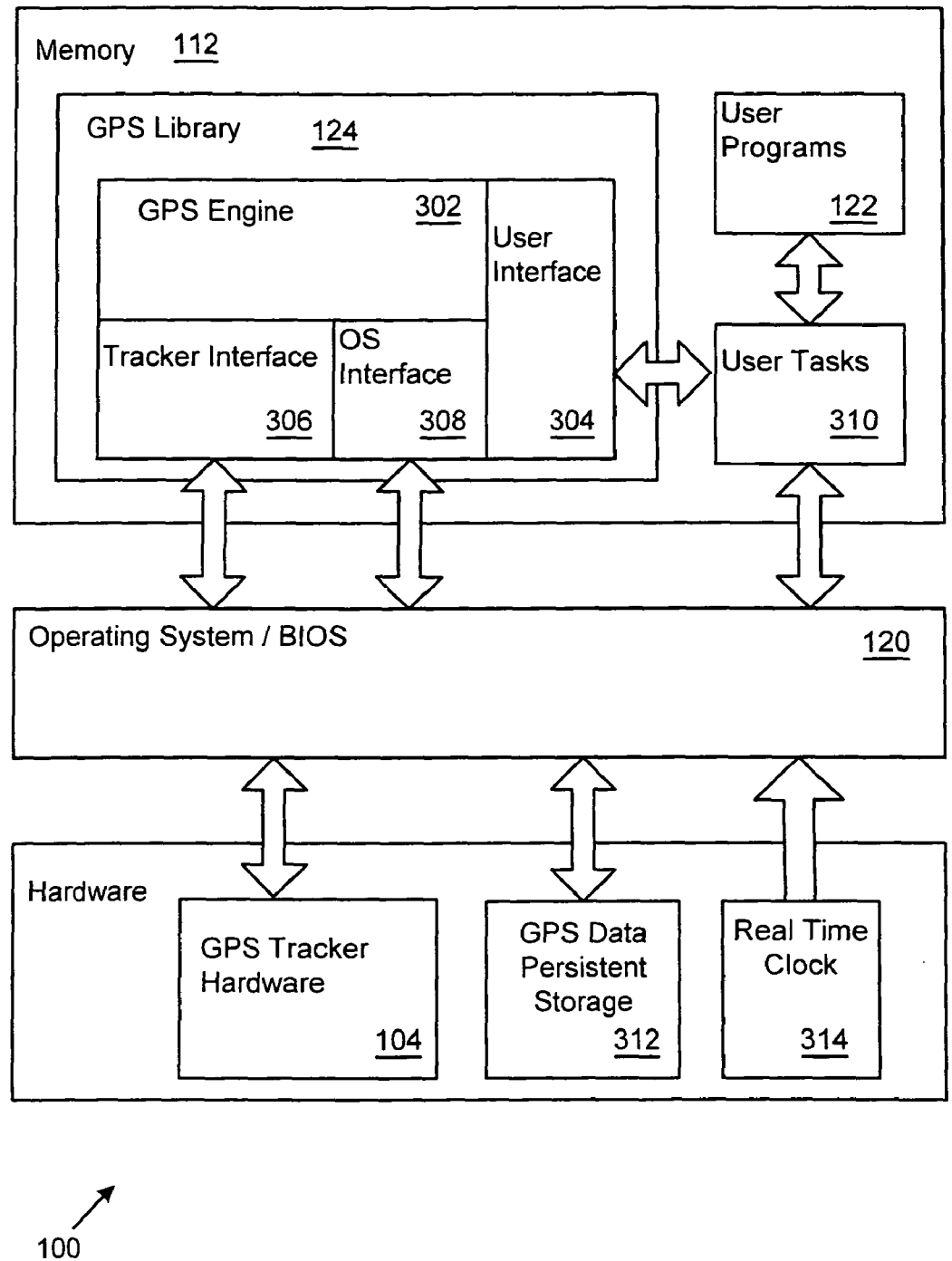
FIG. 3 depicts a hardware and software diagram of a positioning system that includes a GPS library with a user interface, a tracker interface, and an operating system interface.

With regard next to FIG. 3, that figure shows a detailed block diagram of a hardware and software diagram 300 for the positioning system 100. The memory 112 in the host 102 includes a SPS library 124, user programs 122 (e.g., map displaying, map matching, dead reckoning and route calculation programs), and the operating system 120 (which may be a multi-threaded operating system). The SPS library 124 includes a positioning engine 302, a user interface 304, a tracker interface 306, and an operating system interface 308. The user tasks 310 implement device drivers or link directly to the user programs 122, as examples.

In addition to the hardware tracker 104, persistent storage 312 and a real time clock 314 may optionally be provided. The persistent storage 312 may be, as examples, 2 KB of Flash memory, battery backed up RAM or a disk drive. The SPS library 124 may use the RTC in the host 102, the RTC 314, or may operate without an RTC.

The user interface 304 is called by the user programs 122 to start and configure the positioning system. The positioning engine 302 calls a function provide by the user program 122 (e.g., GPS_Output) to deliver positioning messages (e.g., position updates and other synchronous and asynchronous data) to the user program 122. The tracker interface 306 provides for communication between the tracker hardware 104 and the host 102 and, to that end, may load and call the operating system 120 serial communication drivers. The operating system interface 308 calls operating system functions for task scheduling and synchronization, RTC access, and storage access.

Figure 4:
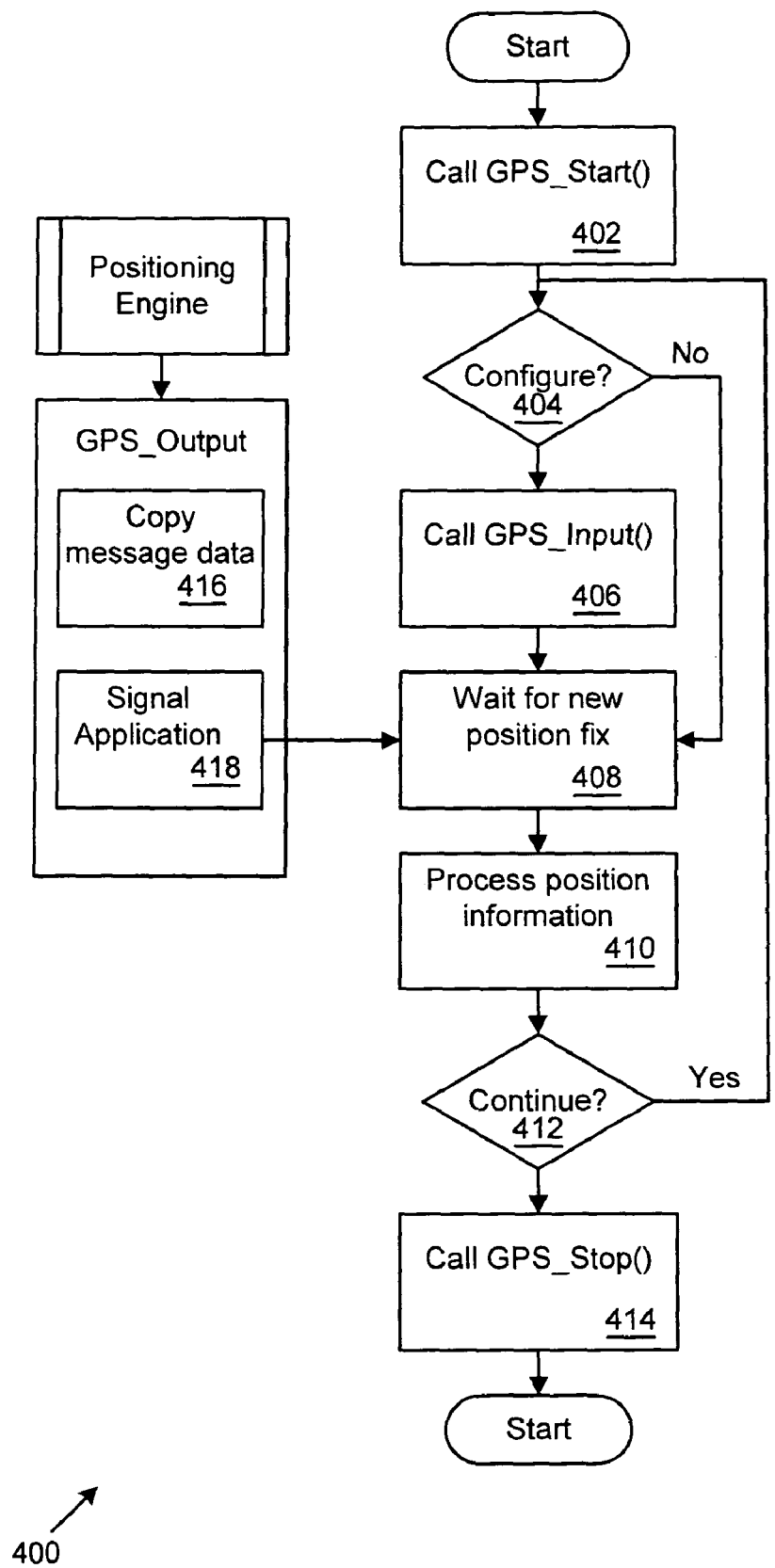
FIG. 4 illustrates a flow diagram of a user program running in the positioning system.

FIG. 4 shows a flow diagram of a user program 122. The user program 122 calls GPS_Start to start the positioning engine 302 (step 402). The user program 122 determines whether to configure the positioning engine 302 (step 404). The program 122 configures the positioning engine 302 by sending a message to the positioning engine 302 using the GPS_Input function, for example (step 406). Next, the program 122 waits for a new position fix (or other information) from the positioning engine 302 (step 408).

When information is received, the user program 122 processes the information, for example, to display or update a map (step 410). If the program 122 continues to run (step 412), processing returns to step 404. Otherwise, the program 122 stops the positioning engine (step 414) and terminates. The positioning engine runs separately and, when new positioning information is available, creates a message for the program 122 (step 416) and sends the message to the program 122 (step 418). Tables 1-5 below show exemplary function calls.

TABLE 1

GPS_Start( )

```
/* Starts GPS Engine tasks, initial acquisition begins: */
tGPS_UINT32          result;
result = GPS_Start (
        GPS_CTRL_MODE_AUTO,   /* default - hot start */
        0,                    /* use default clock offset */
        1,                    /* use port 1 */
        38400                 /* baud rate */
        );
```

TABLE 2

User Callback GPS_Output( )

```
/* User callback function. Receives all communication from GPS. */
#include "GPS_interface.h"
void GPS_Output(
        tGPS_UINT32 message_id,
        void *      message_structure,
        tGPS_UINT32 length )
{
    tGPS_NAV_MEASURED_NAVIGATION nav_data;
    switch ( message_id )
    {
       case GPS_NAV_MEASURED_NAVIGATION:
           memcpy( &nav_data, message_structure,
sizeof(tGPS_NAV_MEASURED_NAVIGATION) );
           if ( nav_data.nav_mode & GPS_MODE_MASK )
           {
           printf("x=%ld, y=%ld, z=%ld \n",
               nav_data.ecef_x, nav_data.ecef_y, nav_data.ecef_z);
           else
              printf("no fix \n");
           break;
       case GPS_NAV_MEASURED_TRACKER:
           /*...*/
           break;
       default:
           /*...*/
           break;
    } // switch
} // GPS_Output( )
```

TABLE 3

Configure using GPS_Input( )

```
/* Configures GPS Engine to turn off SBAS correction: */
    tGPS_NAV_SET_DGPS_SOURCE   DGPSSrc;
    tGPS_UINT32                result;
    DGPSSrc.bit_rate = 0;
    DGPSSrc.freq = 0;
    DGPSSrc.src = GPS_DGPS_SRC_NONE;
    result = GPS_Input( GPS_NAV_SET_DGPS_SOURCE,
(void*)&DGPSSrc, sizeof(DGPSSrc) );
```

TABLE 4

Configure using GPS_Input( )

```
/* Forces cold start of GPS receiver: */
    tGPS_NAV_INITIALIZE        InitMsg;
    tGPS_UINT32                result;
    memset(&InitMsg, 0, sizeof(InitMsg));
    InitMsg.restart_flags = GPS_RESTART_COLD;
    result = GPS_Input (   GPS_NAV_INITIALIZE,
        (void*)&InitMsg, sizeof(InitMsg) );
```

TABLE 5

GPS_Stop( )

```
/* Stops GPS Engine and all SiRFNav tasks: */
    tGPS_UINT32        result;
    result = GPS_Stop( );
```

Below, one exemplary implementation of the user interface 304, tracker interface 306, and an operating system interface 308 is set forth. Table 6 shows which functions and messages are associated with each interface, while Tables 7-10 set forth files and data types used or referred to in the follow description.

TABLE 6

Interface Functions and Messages

User Interface:
GPS_Start( )
GPS_Stop( )
GPS_Output( )
GPS_Input( )
GPS_NAV_MEASURED_NAVIGATION output message
GPS_NAV_MEASURED_TRACKER output message
GPS_NAV_SW_VERSION output message
GPS_NAV_CLOCK_STATUS output message
GPS_NAV_ERROR output message
GPS_ADC_ODOMETER_DATA output message
GPS_NAV_COMPLETE output message
GPS_NAV_TEXT output message
GPS_NAV_INITIALIZE input message
GPS_NAV_POLL_SW_VERSION input message
GPS_NAV_SET_DGPS_SOURCE input message
GPS_NAV_POLL_CLOCK_STATUS input message
GPS_NAV_SET_SBAS_PRN input message
Operating system interface:
OS_Thread_Create( )
OS_Thread_Delete( )
OS_Thread_Sleep( )
OS_Mutex_Create( )
OS_Mutex_Delete( )
OS_Mutex_Enter( )
OS_Mutex_Exit( )
OS_Semaphore_Create( )
OS_Semaphore_Delete( )
OS_Semaphore_Wait( )
OS_Semaphore_Release( )
OS_Storage_Open( )
OS_Storage_Close( )
OS_Storage_Write( )
OS_Storage_WriteAll( )
OS_Storage_Read( )
OS_RTC_Read( )
Tracker interface:
GPS_COMM_TRK_Create( )
GPS_COMM_TRK_Delete( )
GPS_COMM_TRK_Open( )
GPS_COMM_TRK_Reopen( )
GPS_COMM_TRK_Close( )

TABLE 6-continued

Interface Functions and Messages

GPS_COMM_TRK_Wait( )
GPS_COMM_TRK_Read( )
GPS_COMM_TRK_Write( )

TABLE 7

| Include file | Description |
| --- | --- |
| gps_types.h | Type definitions used in GPS library interfaces |
| gps_rtos.h | Definitions and prototypes of the GPS operating system interface |
| gps_ctrl.h | Definitions and prototypes of the GPS control interface |
| gps_interface.h | Definitions and prototypes of the GPS communication interface |
| gps_messages.h | Definitions and structure defines of messages used by the communication interface |
| gps_comm_trk.h | Definitions and prototypes of the tracker communication interface |
| gps_proto_sirfbinary.h | Definitions and prototypes of the binary serial protocol |
| gps_debug.h | Definitions for development and debugging |

TABLE 8

| Source file | Description |
| --- | --- |
| gps_rtos.c | Contains implementation of the GPS operating system interface |
| gps_comm_trk.c | Contains implementation of the tracker communication interface |

TABLE 9

| Library file | Description |
| --- | --- |
| SiRFNavServer.lib | GPS receiver library |

TABLE 10

Data Types

| Type name | Data range | Defined as |
| --- | --- | --- |
| tGPS_SINT8 | −128 ... 127 | signed char |
| tGPS_UINT8 | 0 ... 255 | unsigned char |
| tGPS_SINT16 | −32768 ... 32767 | signed short |
| tGPS_UINT16 | 0 ... 65535 | unsigned short |
| tGPS_SINT32 | −2147483648 ... 2147483647 | signed long |
| tGPS_UINT32 | 0 ... 4294967295 | unsigned long |
| tGPS_HANDLE | 32 bit pointer | void* |

The user or GPS interface includes a GPS control interface and a GPS communication interface. The GPS control Interface functions allow a user program to start and stop the GPS engine using the functions shown in Table 11.

TABLE 11

| Function | Description | Provided in |
| --- | --- | --- |
| GPS_Start( ) | Starts GPS engine | GPS library |
| GPS_Stop( ) | Stops GPS engine | GPS library |

The GPS communication interface functions allow a user program to send and receive messages to and from the GPS engine using the functions shown in Table 12.

TABLE 12

| Function | Description | Provided in |
| --- | --- | --- |
| GPS_Output( ) | Receives a data from the GPS engine | user code |
| GPS_Input( ) | Send commands to the GPS engine | GPS library |

GPS_Start( ) initializes and starts positioning engine threads and communication interface. This function should be called by user programs to start GPS activity.

TABLE 13

Include file
    gps_ctrl.h
Syntax
    tGPS_RESULT GPS_Start(tGPS_UINT32 start_mode,
        tGPS_UINT32 clock_offset,
        tGPS_UINT32 port_num,
        tGPS_UINT32 baud_rate )

| Parameter | Data range | Units | Description |
| --- | --- | --- | --- |
| start_mode |  |  | Start configuration flags. See Table 14below for details. |
| clock_offset | 0, 25000 ... 146000 | Hz | Default GPS clock offset. This value is used by the factory start or when a saved value is not available. This value should reflect a tracker's hardware peculiarity. If zero is provided here a default value of 96250 Hz is used. |
| port_num | 1 ... 64 |  | Specifies a communication port where tracker is connected to. 1 = serial port 1, 2 = serial port 2, ... |
| baud_rate | 4800, 38400, 57600, 115200 | bps | Specifies a baud rate at which tracker is connected to. Default 2t tracker baud rate is 38400 bps. |

TABLE 14

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| Reserved. Write 0 only. | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Text enable | ADC mode. See below. | | | Reserved. Write 0 only. | | | | | | | | Start type. See below for allowed values. | | | |

TABLE 15

Text Enable

| Value | Macro | Description |
|---|---|---|
| 0 | | Development text messages are disabled after start. Can be enabled later by GPS input message. |
| 1 | GPS_CTRL_MODE_TEXT_ENABLE | Enables development text messages right after start (via GPS_Output( ) function) |

TABLE 16

ADC Mode

| Value | Macro | Description |
|---|---|---|
| 0 | | ADC messages from tracker are disabled. |
| 1 | GPS_CTRL_MODE_ADC_ENABLE_1HZ | Enables ADC message from tracker at 1 Hz rate |
| 2 | GPS_CTRL_MODE_ADC_ENABLE_10HZ | Enables ADC message from tracker at 10 Hz rate |
| 3 | | Reserved |

TABLE 17

Start Type

| Value | Macro | Description |
|---|---|---|
| 0 | GPS_CTRL_MODE_AUTO | GPS will automatically choose a start mode accordingly to availability of time, position and ephemeris information. This start mode should be used for normal operation. |
| 1 | GPS_CTRL_MODE_HOT | For testing purposes only. GPS will make a hot start. |
| 2 | GPS_CTRL_MODE_WARM | For testing purposes only. GPS will make a warm start. |
| 3 | GPS_CTRL_MODE_COLD | For testing purposes only. GPS will make a cold start. |
| 4 | GPS_CTRL_MODE_FACTORY | For testing purposes only. GPS will make a factory cold start. All saved information will be deleted. |
| 5 | GPS_CTRL_MODE_TEST | For SiRF internal testing purposes only. |
| Other value | | Reserved |

TABLE 18

| Return value | Description |
|---|---|
| GPS_SUCCESS | GPS engine has started successfully |
| GPS_CTRL_ALREADY_STARTED | Error: GPS engine is already running |
| GPS_CTRL_INVALID_MODE | Error: invalid start mode |
| GPS_CTRL_CLOCK_OFFSET_OUT_OF_RANGE | Error: clock offset is out of range |
| GPS_CTRL_ERROR_OPENING_PORT | Error: could not open serial port |
| GPS_CTRL_RTOS_ERROR | Error creating OS objects (threads, semaphores, mutexes) |

TABLE 19

Example

```
#include "gps_types.h"
#include "gps_ctrl.h"
if ( GPS_Start(GPS_CTRL_MODE_AUTO |
GPS_CTRL_MODE_TEXT_ENABLE,
96250, 1, 38400) != GPS_SUCCESS )
{
    // error handler
}
// GPS engine has started successfully
...
```

The GPS_Stop function stops the positioning engine threads and communication interface. This function should be called by the user program to stop GPS activity.

Include file
gps_ctrl.h
Syntax
tGPS_RESULT GPS_Stop( void )

TABLE 20

| Return value | Description |
|---|---|
| GPS_SUCCESS | GPS engine has stopped successfully |
| GPS_CTRL_ALREADY_STOPPED | Error: GPS engine is already stopped |

TABLE 21

Example

```
#include "gps_types.h"
#include "gps_ctrl.h"
if ( GPS_Stop( ) != GPS_SUCCESS )
{
    // error handler
}
// GPS engine has stopped successfully
...
```

The GPS_Output function retrieves a message from positioning engine. There are no return values. The function is called by the positioning engine whenever any message is sent out. This function is implemented by the user program and statically linked with the GPS library.

TABLE 22

Syntax
void GPS_Output( tGPS_UINT32 message_id, void *message_structure, tGPS_UINT32 length )

| Parameter | Data range | Units | Description |
|---|---|---|---|
| message_id | GPS_NAV_MEASURED_NAVIGATION GPS_NAV_MEASURED_TRACKER GPS_NAV_RAW_TRACKER GPS_NAV_SW_VERSION GPS_NAV_CLOCK_STATUS GPS_NAV_50BPS_DATA GPS_NAV_ERROR GPS_NAV_ACK GPS_NAV_NAK GPS_NAV_VISIBLITY_LIST GPS_NAV_NL_MEAS_DATA GPS_NAV_NL_DGPS_DATA GPS_NAV_NL_SV_STATE_DATA GPS_NAV_NL_INIT_DATA GPS_ADC_ODOMETER_DATA GPS_NAV_COMPLETE GPS_NAV_TEXT | | Message identifier. See chapter 7 for message details. |
| message_structure | 32 bit pointer | | Pointer to the message structure with data |

TABLE 22-continued

| Length | Varies depending on the message | bytes | Length of the message structure |

TABLE 23

Example

```
#include "gps_types.h"
#include "gps_interface.h"
#include "gps_messages.h"
void GPS_Output( tGPS_UINT32 message_id, void
*message_structure, tGPS_UINT32 length )
{
    tGPS_NAV_MEASURED_NAVIGATION nav_data;
    switch ( message_id )
    {
      case GPS_NAV_MEASURED_NAVIGATION:
        memcpy( &nav_data, message_structure,
sizeof(tGPS_NAV_MEASURED_NAVIGATION) );
            if ( nav_data.nav_mode & GPS_MODE_MASK )
                printf("x=%ld, y=%ld, z=%ld \n",
                nav_data.ecef_x, nav_data.ecef_y, nav_data.ecef_z);
            else
                printf("no fix \n");
            break;
      case GPS_NAV_MEASURED_TRACKER:
        // use tracker information here
        break;
      default:
        break;
    } // switch
} // GPS_Output( )
```

The GPS_Input function sends a command to the GPS engine. The function may be called by the client program to send a command to the GPS receiver.

TABLE 24

Include file
gps_interface.h
Syntax
tGPS_UINT32 GPS_Input( tGPS_UINT32 message_id, void *message_structure, tGPS_UINT32 length )

| Parameter | Data range | Units | Description |
|---|---|---|---|
| message_id | GPS_NAV_INITIALIZE<br>GPS_NAV_POLL_SW_VERSION<br>GPS_NAV_SET_DGPS_SOURCE<br>GPS_NAV_SET_NAV_MODE<br>GPS_NAV_SET_DOP_MODE<br>GPS_NAV_SET_DGPS_MODE<br>GPS_NAV_SET_ELEV_MASK<br>GPS_NAV_SET_POWER_MASK<br>GPS_NAV_SET_STAT_NAV<br>GPS_NAV_POLL_CLOCK_STATUS<br>GPS_NAV_POLL_RX_MGR_PARAMS<br>GPS_NAV_SET_MSG_RATE<br>GPS_NAV_SET_SBAS_PRN | | Message identifier. See chapter 7 for message details. |
| message_structure | 32 bit pointer | | Pointer to the message structure with data to send |
| length | Varies depending on the message | bytes | Length of the message structure |

TABLE 25

Return values

| Return value | Description |
|---|---|
| GPS_SUCCESS | Message was sent successfully |
| GPS_ERROR | Error: Message was not acknowledged |
| GPS_ERROR_NOT_STARTED | Error: GPS engine is not running |

TABLE 26

Example

```
#include "gps_types.h"
#include "gps_interface.h"
#include "gps_messages.h"
/* Forces cold start of GPS receiver: */
tGPS_NAV_INITIALIZE    InitMsg;
tGPS_UINT32            result;
memset( &InitMsg, 0, sizeof(tGPS_NAV_INITIALIZE) );
InitMsg.restart_flags = GPS_RESTART_COLD;
result = GPS_Input( GPS_NAV_INITIALIZE, (void*)&InitMsg,
sizeof(tGPS_NAV_INITIALIZE) );
```

The GPS communication interface messages are exchanged between the GPS client (e.g., a user program) and positioning or GPS engine via the user interface input and output functions.

TABLE 27

| Primary GPS output messages | | |
|---|---|---|
| Message id value | Message id macro | Description |
| 2 (0x02) | GPS_NAV_MEASURED_NAVIGATION | Provides ECEF position, velocity, GPS time, position status |
| 4 (0x04) | GPS_NAV_MEASURED_TRACKER | Provides satellite status, azimuth, elevation and C/No information |
| 6 (0x06) | GPS_NAV_SW_VERSION | Provides GPS engine software version |
| 7 (0x07) | GPS_NAV_CLOCK_STATUS | Provides current GPS clock status |
| 10 (0x0A) | GPS_NAV_ERROR | Provides error information |
| 45 (0x2D) | GPS_ADC_ODOMETER_DATA | Provides ADC, odometer and GPIO values from tracker |
| 47 (0x2F) | GPS_NAV_COMPLETE | This message is sent as a last one in the navigation cycle. Informs that navigation cycle is complete. |
| 255 (0xFF) | GPS_NAV_TEXT | Provides development text information |

TABLE 28

| Primary GPS input messages | | |
|---|---|---|
| Message id value | Message id macro | Description |
| 128 (0x80) | GPS_NAV_INITIALIZE | Performs re-initialization of the GPS receiver: factory, cold, warm or hot restarts. |
| 132 (0x84) | GPS_NAV_POLL_SW_VERSION | Asks for the GPS engine software version |
| 133 (0x85) | GPS_NAV_SET_DGPS_SOURCE | Sets differential correction source |
| 144 (0x90) | GPS_NAV_POLL_CLOCK_STATUS | Asks for the current GPS clock status |
| 170 (0xAA) | GPS_NAV_SET_SBAS_PRN | Sets SBAS (WAAS/EGNOS) PRN number |

TABLE 29

| Additional GPS output messages for development and debug process | | |
|---|---|---|
| Message id value | Message id macro | Description |
| 8 (0x08) | GPS_NAV_50BPS_DATA | Provides 50 bps subframe data |
| 11 (0x0B) | GPS_NAV_ACK | Command acknowledgment |
| 12 (0x0C) | GPS_NAV_NAK | Command not acknowledgment |
| 13 (0x0D) | GPS_NAV_VISIBLITY_LIST | Provides current visibilty list |
| 28 (0x1C) | GPS_NAV_NL_MEAS_DATA | Provides navigation library measurement data |
| 29 (0x1D) | GPS_NAV_NL_DGPS_DATA | Provides navigation library differential data |
| 30 (0x1E) | GPS_NAV_NL_SV_STATE_DATA | Provides navigation library satellite state data |
| 31 (0x1F) | GPS_NAV_NL_INIT_DATA | Provides navigation library initialization data |

TABLE 30

Additional GPS input messages for development and debug process

| Message id value | Message id macro | Description |
|---|---|---|
| 136 (0x88) | GPS_NAV_SET_NAV_MODE | Sets navigation mode |
| 137 (0x89) | GPS_NAV_SET_DOP_MODE | Sets DOP mask control mode |
| 138 (0x8A) | GPS_NAV_SET_DGPS_MODE | Sets differential mode of operation |
| 139 (0x8B) | GPS_NAV_SET_ELEV_MASK | Sets elevation mask |
| 140 (0x8C) | GPS_NAV_SET_POWER_MASK | Sets power mask |
| 143 (0x8F) | GPS_NAV_SET_STAT_NAV | Configures static navigation mode |
| 152 (0x98) | GPS_NAV_POLL_RX_MGR_PARAMS | Asks for current navigation parameters |
| 166 (0xA6) | GPS_NAV_SET_MSG_RATE | Sets message output rate |

The GPS_NAV_MEASURED_NAVIGATION output message provides ECEF position, velocity, GPS time and position status information. The message is outputted periodically at 1 Hz rate.

TABLE 31

Include file gps_messages.h

Message id:

| Value | Macro |
|---|---|
| 2 (0x02) | GPS_NAV_MEASURED_NAVIGATION |

TABLE 33 nav_mode bit fields

| 7 | 6 | 5 | 4 | 3 | 2 | 1 | 0 |
|---|---|---|---|---|---|---|---|
| DGPS status | DOP mask status | Altitude status | | reserved 0 | | Position status | |

TABLE 32

Message structure tGPS_NAV_MEASURED_NAVIGATION

| Structure member | Data type | Data range (after de-scaling) | Scale factor | Units | Description |
|---|---|---|---|---|---|
| ecef_x | SINT32 | | 1 | meters | Computed ECEF position. |
| ecef_y | SINT32 | | 1 | meters | |
| ecef_z | SINT32 | | 1 | meters | |
| ecef_vel_x | SINT16 | | 0.125 | m/sec | Computed ECEF velocity |
| ecef_vel_y | SINT16 | | 0.125 | m/sec | |
| ecef_vel_z | SINT16 | | 0.125 | m/sec | |
| nav_mode | UINT8 | | n/a | n/a | Navigation status flags. See below for details. |
| hdop | UINT8 | 0 ... 50.0 | 0.2 | n/a | Horizontal Dilution Of Precision |
| nav_mode2 | UINT8 | | n/a | n/a | Navigation status flags. See below for details. |
| gps_week | UINT16 | >0 | 1 | n/a | Computed full GPS week number. |
| gps_tow | UINT32 | 0 ... 604799.99 | 0.01 | sec. | Computed GPS time of the week. |
| sv_used_cnt | UINT8 | 0 ... 12 | 1 | n/a | Number of satellites used in solution. |
| sv_used | UINT8[12] | 1 ... 32 | 1 | n/a | Array of PRN numbers of satellites used in solution |

Note:
To get a real value of the parameter a value from the structure should be multiplied by the scale factor.

TABLE 34

Position status

| Value | Macro | Description |
|---|---|---|
| 0 | | No navigation solution |
| 1 | | 1 satellite degraded solution |
| 2 | | 2 satellites degraded solution |
| 3 | | 3 satellites solution (2D) |
| 4 | | More than 3 satellites solution (3D) |
| 5 | | 3 satellites least square solution (2D) |
| 6 | | More than 3 satellites least square solution (3D) |
| 7 | | Dead reckoning |

TABLE 35

Altitude status

| Value | Macro | Description |
|---|---|---|
| 0 | | No altitude hold |
| 1 | | Altitude used from filter |
| 2 | | Altitude used from user |
| 3 | | Forced altitude (from user) |

TABLE 36

DOP mask status:

| Value | Macro | Description |
|---|---|---|
| 0 | | DOP mask not exceeded |
| 1 | GPS_MODE_DOP_MASK_EXCEED | DOP mask exceeded |

TABLE 37

DGPS status:

| Value | Macro | Description |
|---|---|---|
| 0 | | Differential corrections are not used in solution |
| 1 | GPS_MODE_DGPS_USED | Differential corrections are used in solution |

TABLE 38 nav_mode2 bit fields:

| 7 | 6 | 5 | 4 | 3 | 2 | 1 | 0 |
|---|---|---|---|---|---|---|---|
| reserved | reserved | reserved | reserved | reserved | DR timed out | Solution validation status | reserved |

TABLE 39

Solution validation status:

| Value | Macro | Description |
|---|---|---|
| 0 | | Solution is not validated |
| 1 | GPS_MODE2_SOLUTION_VALIDATED | Solution is validated |

TABLE 40

DR timed out status:

| Value | Macro | Description |
|---|---|---|
| 0 | | Dead reckoning not timed out |
| 1 | GPS_MODE2_DR_TIMED_OUT | Dead reckoning has timed out |

The GPS_NAV_MEASURED_TRACKER output message provides satellite status, azimuth, elevation and C/No information. The message is outputted periodically at 1 Hz rate.

TABLE 41

Include file gps_messages.h

Message id:

| Value | Macro |
|---|---|
| 4 (0x04) | GPS_NAV_MEASURED_TRACKER |

TABLE 42

Message Structure
Message structure
tGPS_NAV_MEASURED_TRACKER

| Structure member | Data type | Data range (after de-scaling) | Scale factor | Units | Description |
|---|---|---|---|---|---|
| gps_week | UINT16 | 1 . . . | 1 | | Computed full GPS week number. |
| gps_tow | UINT32 | 0 . . . 604799.99 | 0.01 | sec. | Computed GPS time of the week. |
| chnl_cnt | UINT8 | 12 | 1 | | Number of receiver's channels |
| chnl | tGPS_SV_INFO[12] | | | | Array of structures containing satellite information for each receiver channel. See below. |

TABLE 43 tGPS_SV_INFO sub-structure:

| Structure member | Data type | Data range (after de-scaling) | Scale factor | Units | Description |
|---|---|---|---|---|---|
| svid | UINT8 | 1 . . . 32 | 1 | | Satellite PRN number |
| azimuth | UINT8 | 0 . . . 359.5 | 1.5 | deg. | Satellite azimuth angle. |
| elevation | UINT8 | 0 . . . 90.0 | 0.5 | deg | Satellite elevation angle |
| state | UINT16 | | n/a | | Satellite tracking status. See below. |
| cno | UINT8[10] | 0 . . . 60 | 1 | dB-Hz | Array of satellite signal to noise ratios for the past second. Measurements are made every 100 ms. Value at index zero is the oldest. |

Note:
To get a real value of the parameter a value from the structure should be multiplied by the scale factor.

TABLE 44 state bit fields:

| 15 | 14 | 13 | 12 | 11 | 10 | 9 | 8 |
|---|---|---|---|---|---|---|---|
| reserved 0 | reserved 0 | reserved 0 | reserved 0 | reserved 0 | reserved 0 | reserved 0 | Initial acquisition in progress |

TABLE 45 state bit fields:

| 7 | 6 | 5 | 4 | 3 | 2 | 1 | 0 |
|---|---|---|---|---|---|---|---|
| Ephemeris data available | Acquisition failed | Code locked | Carrier Pulling done | Sub Frame sync done | Bit sync done | Delta Phase valid | Acquisition success |

The GPS_NAV_SW_VERSION output message provides a positioning engine software version string. Message is sent as a reply to the GPS_NAV_POLL_SW_VERSION input message.

TABLE 46

Include file gps_messages.h

Message id:

| Value | Macro |
|---|---|
| 6 (0x06) | GPS_NAV_SW_VERSION |

TABLE 47

Message structure tGPS_NAV_SW_VERSION

| Structure member | Data type | Data range (after de-scaling) | Scale factor | Units | Description |
|---|---|---|---|---|---|
| sw_version[100] | UINT8 | ASCII characters | | | GPS engine software version. Version string is NULL terminated. Message length is variable but does not exceed 100 bytes. |

The GPS_NAV_CLOCK_STATUS output message provides current GPS clock status information. Message is outputted periodically at 1 Hz rate or on demand as a reply to GPS_NAV_POLL_CLOCK_STATUS input message.

TABLE 48

| | Include file<br>gps_messages.h |
|---|---|
| | Message id: |
| Value | Macro |
| 7 (0x07) | GPS_NAV_CLOCK_STATUS |

TABLE 49

Message structure<br>tGPS_NAV_CLOCK_STATUS

| Structure member | Data type | Data range (after de-scaling) | Scale factor | Units | Description |
|---|---|---|---|---|---|
| gps_week | UINT16 | 1 ... | 1 | | Computed full GPS week number. |
| gps_tow | UINT32 | 0 ... 604799.99 | 0.01 | sec | Computed GPS time of the week. |
| sv_used_cnt | UINT8 | 0 ... 12 | 1 | | Number of satellites used in solution. |
| clk_offset | UINT32 | 25000 ... 146000 | 1 | Hz | Computed clock offset |
| clk_bias | UINT32 | 0 ... 0.1 | 1e−9 | sec | Computed clock bias |
| est_gps_time | UINT32 | 0 ... 604799.999 | 0.001 | sec | Estimated GPS time |

Note:
To get a real value of the parameter a value from the structure should be multiplied by the scale factor.

The GPS_NAV_ERROR output message outputs notification, warning, and alert messages.

TABLE 50

| | Include file<br>gps_messages.h |
|---|---|
| | Message id: |
| Value | Macro |
| 10 (0x0A) | GPS_NAV_ERROR |

TABLE 51

Message structure<br>tGPS_NAV_ERROR

| Structure member | Data type | Data range (after de-scaling) | Scale factor | Description |
|---|---|---|---|---|
| err_id | UINT16 | 0 ... 0x0FFF | n/a | Notification code |
| | | 0x1000 ... 0x1FFF | n/a | Warning code |
| | | 0x2000 ... 0x2FFF | n/a | Alert code |
| param_cnt | UINT16 | 0 ... 5 | 1 | Number of 32-bit parameters in param[ ] |
| param[5] | UINT32 | UINT32 range | n/a | Array of information parameters. Meaning depends on error code |

The GPS_ADC_ODOMETER_DATA output message provides ADC, odometer and GPIO lines state from tracker. Message is outputted periodically at 1 or 10 Hz rate depending on setting used in GPS_Start( ) function.

TABLE 52

| | Include file<br>gps_messages.h |
|---|---|
| | Message id: |
| Value | Macro |
| 45 (0x2D) | GPS_ADC_ODOMETER_DATA |

TABLE 53

Message structure
tGPS_ADC_ODOMETER_DATA

| Structure member | Data type | Data range (after de-scaling) | Scale factor | Units | Description |
|---|---|---|---|---|---|
| current_time | UINT32 | >=0 | 1 | ms | Tracker Time, millisecond counts from tracker reset |
| adc2_avg | INT16 | −8192 ... 8191 | 1 | n/a | Averaged measurement from ADC[2] input. See below for voltage formula. |
| adc3_avg | INT16 | −8192 ... 8191 | 1 | n/a | Averaged measurement from ADC[3] input. See below for voltage formula. |
| odo_count | UINT16 | 0 ... 0xFFFF | 1 | n/a | Odometer counter measurement at the most recent 100 ms tracker input |
| gpio_stat | UINT8 | 0 ... 0xFF | n/a | n/a | GPIO input states at the most recent 100 ms tracker input. Bit field, see below. |

TABLE 54 gpio_stat bit field:

| 7 | 6 | 5 | 4 | 3 | 2 | 1 | 0 |
|---|---|---|---|---|---|---|---|
| GPIO12 input state | GPIO8 input state | GPIO7 input state | GPIO5 input state | GPIO4 input state | GPIO3 input state | GPIO2 input state | GPIO0 input state |

TABLE 55

GPIOxx state:

| Value | Macro | Description |
|---|---|---|
| 0 | | Input pin xx is in low state |
| 1 | | Input pin xx is in high state |

In one implementation, the Voltage formula is $U_{in}[V]=V_{ref}*((adcX\_avg+8192)/16384)$, where: $V_{ref}=2.55V$, and adcX_avg is a measurement value from message above. The analog to digital converter may, for example, take measurements at 50 Hz rate and the reported value adcX_avg may be an average of the last 5 samples.

The GPS_NAV_COMPLETE output message is sent at the end of the navigation cycle to confirm that the GPS engine has finished a position computation cycle (with or without success). In one implementation, this message is outputted at 1 Hz rate.

TABLE 56

Include file
gps_messages.h

Message id:

| Value | Macro |
|---|---|
| 47 (0x2F) | GPS_NAV_COMPLETE |

TABLE 57

Message structure
tGPS_NAV_COMPLETE

| Structure member | Data type | Data range (after de-scaling) | Scale factor | Units | Description |
|---|---|---|---|---|---|
| control | UINT8 | 0 | | | Not in use. |

The GPS_NAV_TEXT output message outputs debug and development messages in text format.

TABLE 58

Include file
gps_messages.h

Message id:

| Value | Macro |
|---|---|
| 255 (0xFF) | GPS_NAV_TEXT |

TABLE 59

Message structure
tGPS_NAV_TEXT

| Structure member | Data type | Data range (after de-scaling) | Scale factor | Units | Description |
|---|---|---|---|---|---|
| msg_text[256] | UINT8 | ASCII characters | | | Text of the message |

The GPS_NAV_INITIALIZE input message performs GPS engine re-initialization. Message should be used to perform factory, cold, warm or hot restart.

TABLE 60

| Include file gps_messages.h | |
|---|---|
| Message id: | |
| Value | Macro |
| 128 (0x80) | GPS_NAV_INITIALIZE |

TABLE 61

Message structure tGPS_NAV_INITIALIZE

| Structure member | Data type | Data range (before scaling) | Scale factor | Units | Description |
|---|---|---|---|---|---|
| ecef_x | SINT32 | | 1 | meters | Approximate ECEF |
| ecef_y | SINT32 | | 1 | meters | position. Those values |
| ecef_z | SINT32 | | 1 | meters | are used by warm start with initialization only. |
| clk_offset | SINT32 | 0, 25000 ... 146000 | 1 | Hz | Default GPS clock offset. This value is used by the factory restart only. If zero is provided here a default value of 96250 Hz is used. |
| gps_tow | UINT32 | 0 ... 604799 | 1 | sec. | Approximate GPS time of the week. This value is used by warm start with initialization only |
| gps_week | UINT16 | 0 ... | 1 | | Approximate full GPS week number. This value is used by warm start with initialization only. |
| chnl_cnt | UINT8 | 12 | 1 | | Number of channels to use. |
| restart_flags | UINT8 | | | | Restart configuration flags. See below for details. |

TABLE 62 restart_flags bit fields:

| 7 | 6 | 5 | 4 | 3 | 2 | 1 | 0 |
|---|---|---|---|---|---|---|---|
| reserved 0 | reserved 0 | Enable text output | reserved 0 | Restart mode. See below for allowed values. | | | |

TABLE 63

Restart mode

| Value | Macro | Description |
|---|---|---|
| 0 | GPS_RESTART_HOT | Hot restart |
| 2 | GPS_RESTART_WARM_NOINIT | Warm restart with no initialization |
| 3 | GPS_RESTART_WARM_INIT | Warm restart with initialization (fields ecef_x, ecef_y, ecef_z, gps_tow, gps_week are used) |
| 6 | GPS_RESTART_COLD | Cold restart |
| 8 | GPS_RESTART_FACTORY | Factory restart |
| Other value | | Reserved |

TABLE 64

| Enable text output: | | |
|---|---|---|
| Value | Macro | Description |
| 0 | | Development text output (messages GPS_NAV_TEXT) is disabled |
| 1 | GPS_RESTART_TEXTOUT | Development text output (messages GPS_NAV_TEXT) is enabled |

In one implementation, the navigation engine will initiate restart within one second and a default clock offset value is 96250 Hz. When the actual clock offset is unknown a value of 96250 Hz should be used. However, if the real clock offset is far from a specified value a longer TTFF will be observed.

TABLE 65

| Example |
|---|
| #include "gps_types.h" |
| #include "gps_interface.h" |
| /* Forces cold start of GPS receiver: */ |
| tGPS_NAV_INITIALIZE  InitMsg; |
| tGPS_UINT32          result; |
| memset( &InitMsg, 0, sizeof(tGPS_NAV_INITIALIZE) ); |
| gps_init.chnl_cnt = 12; |
| gps_init.restart_flags = GPS_RESTART_HOT \| |
| GPS_RESTART_TEXTOUT; |
| result = GPS_Input( GPS_NAV_INITIALIZE, (void*)&InitMsg, sizeof(tGPS_NAV_INITIALIZE) ); |

The GPS_NAV_POLL_SW_VERSION input message asks for the software version of the position/GPS library.

TABLE 66

| Include file |
|---|
| gps_messages.h |

| Message id: | |
|---|---|
| Value | Macro |
| 132 (0x84) | GPS_NAV_POLL_SW_VERSION |

TABLE 67

| Message structure | | | | | |
|---|---|---|---|---|---|
| tGPS_NAV_POLL_SW_VERSION | | | | | |
| Structure member | Data type | Data range (before scaling) | Scale factor | Units | Description |
| control | UINT8 | 0 | | | Not in use. |

The software version string may be returned, for example, in a GPS_NAV_SW_VERSION output message via GPS_Output( ) function.

The GPS_NAV_SET_DGPS_SOURCE input message selects a data source for differential (DGPS) corrections.

TABLE 68

| Include file |
|---|
| gps_messages.h |

| Message id: | |
|---|---|
| Value | Macro |
| 133 (0x85) | GPS_NAV_SET_DGPS_SOURCE |

TABLE 69

| Message structure | | | | | |
|---|---|---|---|---|---|
| tGPS_NAV_SET_DGPS_SOURCE | | | | | |
| Structure member | Data type | Data range (before scaling) | Scale factor | Units | Description |
| src | UINT8 | see below | n/a | n/a | Selects differential correction data source. Default is NONE after factory reset. |

TABLE 69-continued

| Message structure | | | | |
|---|---|---|---|---|
| freq | UINT32 | 0 | | Internal beacon frequency. Not used, set to 0. |
| bit_rate | UINT8 | 0 | | Internal beacon bit rate. Not used, set to 0. |

TABLE 70

| Differential correction source: | | |
|---|---|---|
| Value | Macro | Description |
| 0 | GPS_DGPS_SRC_NONE | Differential corrections are not used for navigation |
| 1 | GPS_DGPS_SRC_SBAS | Selects SBAS as a data source |
| Other value | | Reserved |

These settings may be saved in nonvolatile data storage.

The GPS_NAV_POLL_CLOCK_STATUS input message asks for the current GPS clock status of the GPS library.

TABLE 71

| Include file |
|---|
| gps_messages.h |

| Message id: | |
|---|---|
| Value | Macro |
| 144 (0x90) | GPS_NAV_POLL_CLOCK_STATUS |

TABLE 72

| Message structure | | | | | |
|---|---|---|---|---|---|
| tGPS_NAV_POLL_CLOCK_STATUS | | | | | |
| Structure member | Data type | Data range (before scaling) | Scale factor | Units | Description |
| control | UINT8 | 0 | | | Not in use. |

The clock status data may be returned in GPS_NAV_CLOCK_STATUS output message via GPS_Output( ) function.

The GPS_NAV_SET_SBAS_PRN input message manually forces PRN for use in SBAS corrections.

TABLE 73

| Include file |
|---|
| gps_messages.h |

| Message id: | |
|---|---|
| Value | Macro |
| 170 (0xAA) | GPS_NAV_SET_SBAS_PRN |

TABLE 74

Message structure tGPS_NAV_SET_DGPS_MODE

| Structure member | Data type | Data range (before scaling) | Scale factor | Units | Description |
|---|---|---|---|---|---|
| prn | UINT8 | 0, 120 ... 138 | 1 | | PRN number, 0 = Automatic search |
| reserved_0 | UINT32 | | | | Reserved |
| reserved_1 | UINT32 | | | | Reserved |

These settings may be saved in permanent data storage.

The Operating System Interface functions are operating system dependent and are implemented in the open source format available from SiRF Technology, Inc. The functions include Thread, mutex and semaphore functions. Permanent storage and RTC functions may be available depending on hardware availability.

TABLE 75

Thread control functions

| Function name | Description | Provided in |
|---|---|---|
| OS_Thread_Create( ) | Function creates a thread | gps_rtos.c |
| OS_Thread_Delete( ) | Function deletes a thread | gps_rtos.c |
| OS_Thread_Sleep( ) | Function suspends a thread for a given time | gps_rtos.c |

TABLE 76

Mutex control functions

| Function name | Description | Provided in |
|---|---|---|
| OS_Mutex_Create( ) | Function creates a mutex object - a software critical section | gps_rtos.c |
| OS_Mutex_Delete( ) | Function deletes a mutex object | gps_rtos.c |
| OS_Mutex_Enter( ) | Function obtains a mutex object | gps_rtos.c |
| OS_Mutex_Exit( ) | Function releases a mutex object | gps_rtos.c |

TABLE 77

Semaphore control functions

| Function name | Description | Implemented in |
|---|---|---|
| OS_Semaphore_Create( ) | Function creates a semaphore object | gps_rtos.c |
| OS_Semaphore_Delete( ) | Function deletes a semaphore object | gps_rtos.c |
| OS_Semaphore_Wait( ) | Function waits for a semaphore | gps_rtos.c |
| OS_Semaphore_Release( ) | Functions releases a semaphore object | gps_rtos.c |

TABLE 78

Permanent storage control functions

| Function name | Description | Implemented in |
|---|---|---|
| OS_Storage_Open( ) | Functions opens a storage system | gps_rtos.c |
| OS_Storage_Close( ) | Functions closes a storage system | gps_rtos.c |

TABLE 78-continued

Permanent storage control functions

| Function name | Description | Implemented in |
|---|---|---|
| OS_Storage_Write( ) | Function writes given words to the non-volatile storage area (battery backed RAM, file, registry, etc.) | gps_rtos.c |
| OS_Storage_WriteAll( ) | Function writes all storage data to the non-volatile storage area (battery backed RAM, file, registry, etc.) | gps_rtos.c |
| OS_Storage_Read( ) | Function retrieves a data from the non-volatile storage area | gps_rtos.c |

TABLE 79

Real Time Clock control function

| Function name | Description | Implemented in |
|---|---|---|
| OS_RTC_Read( ) | Function returns a current time from on-board's real time clock. | gps_rtos.c |

The OS_Thread_Create( ) function uses an appropriate operating system service to create a thread. The function is called by the GPS engine at the startup to create all desired threads.

TABLE 80

File
gps_rtos.c
Syntax
tGPS_UINT32 OS_Thread_Create( tGPS_UINT32 thread_id,
 tGPS_HANDLE function_ptr,
 tGPS_THREAD *thread_handle )

| Parameter | Data range | Units | Description |
|---|---|---|---|
| thread_id | Thread macros defined in gps_rtos.h | | Identifier of the thread to be created |
| function_ptr | | | Thread function |
| thread_handle | | | Handle of the created thread |

TABLE 81

Return values

| Return value | Description |
|---|---|
| GPS_SUCCESS | Thread was created successfully |
| GPS_RTOS_ERROR | An error occurred |

A maximum number of desired threads may be specified by a GPS_RTOS_THREAD_MAX define.

The OS_Thread_Delete( ) function uses appropriate OS service to stop a thread and/or to wait for thread to gracefully stop. Function is called by the GPS engine from GPS_Stop( ) to stop all SiRFNav threads.

TABLE 82

File
gps_rtos.c
Syntax
 tGPS_UINT32 OS_Thread_Delete(tGPS_THREAD thread_handle,
 tGPS_UINT32 timeout )

TABLE 82-continued

| Parameter | Data range | Units | Description |
|---|---|---|---|
| thread_handle | | | Thread handle |
| Timeout | | ms | Grace period allowed before terminating the thread |

TABLE 83

| Return values | |
|---|---|
| Return value | Description |
| GPS_SUCCESS | Thread was deleted successfully |
| GPS_RTOS_ERROR | An error occurred |

Thread identifiers and functions may be specified, for example, in the gps_rtos.h header file.

The OS_Thread_Sleep( ) function uses appropriate OS service to suspend a thread for a given number of milliseconds. Function is called by the GPS engine to suspend current thread temporarily.

TABLE 84

File
gps_rtos.c
Syntax
tGPS_UINT32 OS_Thread_Sleep (tGPS_UINT32 milliseconds )

| Parameter | Data range | Units | Description |
|---|---|---|---|
| Miliseconds | | ms | Time for what thread will be suspended |

TABLE 85

| Return values | |
|---|---|
| Return value | Description |
| GPS_SUCCESS | Thread sleep has finished successfully |

The OS_Mutex_Create( ) function uses an operating system service to create a Mutex (mutually exclusive) object, or OS-specific equivalent such as a software critical section. This function is called by the GPS engine at the startup to create all desired mutexes.

TABLE 86

File
gps_rtos.c
Syntax
tGPS_UINT32 OS_Mutex_Create( tGPS_MUTEX *mx_handle )

| Parameter | Data range | Units | Description |
|---|---|---|---|
| mx_handle | | | Handle of the created mutex object |

TABLE 87

| Return values | |
|---|---|
| Return value | Description |
| GPS_SUCCESS | Mutex was successfully created |
| GPS_RTOS_ERROR | An error occurred |

The maximum number of desired mutexes may be specified by a GPS_RTOS_MUTEX_MAX define.

The OS_Mutex_Delete( ) function uses an operating system service to delete a Mutex object. The function is called by the GPS engine at the stopping procedure to delete all used mutexes.

TABLE 88

File
gps_rtos.c
Syntax
tGPS_UINT32 OS_Mutex_Delete( tGPS_MUTEX mx_handle )

| Parameter | Data range | Units | Description |
|---|---|---|---|
| mx_handle | | | Mutex object handle |

TABLE 89

| Return values | |
|---|---|
| Return value | Description |
| GPS_SUCCESS | Mutex was successfully deleted |
| GPS_RTOS_ERROR | An error occurred |

The OS_Mutex_Enter( ) function uses an operating system service to obtain a Mutex object. This function is called by the GPS engine just before entering into a critical section.

TABLE 90

File
gps_rtos.c
Syntax
tGPS_UINT32 OS_Mutex_Enter( tGPS_MUTEX mx_handle )

| Parameter | Data range | Units | Description |
|---|---|---|---|
| mx_handle | | | Mutex object handle |

TABLE 91

| Return values | |
|---|---|
| Return value | Description |
| GPS_SUCCESS | Mutex was successfully obtained |
| GPS_RTOS_ERROR | An error occurred |

The OS_Mutex_Exit( ) function uses appropriate OS service to release a Mutex object. Function is called by the GPS engine just after leaving from a critical section.

TABLE 92

| | |
|---|---|
| File | |
| gps_rtos.c | |
| Syntax | |
| tGPS_UINT32 OS_Mutex_Exit( tGPS_MUTEX mx_handle ) | |

| Parameter | Data range | Units | Description |
|---|---|---|---|
| mx_handle | | | Mutex object handle |

TABLE 93

| Return values | |
|---|---|
| Return value | Description |
| GPS_SUCCESS | Mutex was successfully released |
| GPS_RTOS_ERROR | An error occurred |

The OS_Semaphore_Create( ) function uses an operating system service to create a Semaphore object. The function is called by the GPS engine at the startup to create all desired semaphores.

TABLE 94

| | |
|---|---|
| File | |
| gps_rtos.c | |
| Syntax | |
| tGPS_UINT32 OS_Semaphore_Create( tGPS_SEMAPHORE *sem_handle, tGPS_UINT32 init_value ) | |

| Parameter | Data range | Units | Description |
|---|---|---|---|
| sem_handle | | | Handle of the created semaphore object |
| init_value | any UINT32 | | Semaphore initialization value |

TABLE 95

| Return values | |
|---|---|
| Return value | Description |
| GPS_SUCCESS | Semaphore was successfully created |
| GPS_RTOS_ERROR | An error occurred |

The maximum number of desired semaphores may specified by a GPS_RTOS_SEM_MAX define.

The OS_Semaphore_Delete( ) function uses an operating system service to delete a Semaphore object. The function is called by the GPS engine at the stopping procedure to delete all used semaphores.

TABLE 96

| | |
|---|---|
| File | |
| gps_rtos.c | |
| Syntax | |
| tGPS_UINT32 OS_Semaphore_Delete( tGPS_SEMAPHORE sem_handle ) | |

| Parameter | Data range | Units | Description |
|---|---|---|---|
| sem_handle | | | Semaphore object handle |

TABLE 97

| Return values | |
|---|---|
| Return value | Description |
| GPS_SUCCESS | Semaphore was successfully deleted |
| GPS_RTOS_ERROR | An error occurred |

The OS_Semaphore_Wait( ) function uses an operating system service to wait for Semaphore object. Function is called by the GPS threads to wait for events.

TABLE 98

| | |
|---|---|
| File | |
| gps_rtos.c | |
| Syntax | |
| tGPS_UINT32 OS_Semaphore_Wait( tGPS_SEMAPHORE sem_handle, tGPS_UINT32 timeout ) | |

| Parameter | Data range | Units | Description |
|---|---|---|---|
| sem_handle | | | Semaphore object handle |
| Timeout | 0-4000000000 or GPS_INFINITE | ms | Maximum time allowed to wait for semaphore |

TABLE 99

| Return values | |
|---|---|
| Return value | Description |
| GPS_SUCCESS | Semaphore was successfully obtained |
| GPS_RTOS_ERROR | An error occurred |
| GPS_RTOS_SEM_WAIT_TIMEOUT | Waiting for the semaphore has timed out, semaphore was not obtained. |

The OS_Semaphore_Release( ) function uses appropriate OS service to release a Semaphore object. The function is called by the GPS engine to schedule other thread.

TABLE 100

| | |
|---|---|
| File | |
| gps_rtos.c | |
| Syntax | |
| tGPS_UINT32 OS_Semaphore_Release( tGPS_SEMAPHORE sem_handle ) | |

| Parameter | Data range | Units | Description |
|---|---|---|---|
| sem_handle | | | Semaphore object handle |

TABLE 101

| Return values | |
|---|---|
| Return value | Description |
| GPS_SUCCESS | Semaphore was successfully released |
| GPS_RTOS_ERROR | An error occurred |

The OS_Storage_Open( ) function uses an operating system or BIOS service to open a non volatile storage system. The function is called by the GPS engine at the startup to open a storage.

TABLE 102

| File | | | |
|---|---|---|---|
| gps_rtos.c | | | |
| Syntax | | | |
| tGPS_RESULT OS_Storage_Open( void ) | | | |
| Parameter | Data range | Units | Description |
| none | | | |

TABLE 103

Return values

| Return value | Description |
|---|---|
| GPS_SUCCESS | Storage has been opened successfully |
| GPS_RTOS_ERROR | An error occurred |

When the nonvolatile storage is not available then function may return GPS_RTOS_ERROR.

The OS_Storage_Close( ) function uses appropriate OS or BIOS service to close a non volatile storage system. The function is called by the GPS engine at the shut down procedure to close a storage.

TABLE 104

| File | | | |
|---|---|---|---|
| gps_rtos.c | | | |
| Syntax | | | |
| tGPS_RESULT OS_Storage_Close( void ) | | | |
| Parameter | Data range | Units | Description |
| none | | | |

TABLE 105

Return values

| Return value | Description |
|---|---|
| GPS_SUCCESS | Storage has been closed successfully |
| GPS_RTOS_ERROR | An error occurred |

When the nonvolatile storage is not available then function may return GPS_RTOS_ERROR.

The OS_Storage_Write( ) function uses appropriate OS or BIOS service to write given words to a non volatile storage system (battery backed RAM, file system, etc.). The function is called by the GPS engine periodically, for example every 30 seconds, to save time, position and ephemeris information. That information is used later to speed up the GPS start procedure (e.g., for hot or warm starts).

TABLE 106

| File | | | |
|---|---|---|---|
| gps_rtos.c | | | |
| Syntax | | | |
| tGPS_RESULT OS_Storage_Write( tGPS_UINT32 offset, tGPS_UINT16 *data, | | | |

TABLE 106-continued

| tGPS_UINT16 words ) | | | |
|---|---|---|---|
| Parameter | Data range | Units | Description |
| offset | | bytes | Offset from the beginning of the storage structure where new data should be written |
| data | | | Pointer to the data to write |
| words | | 16 bit words | Number of 16 bit words to write |

TABLE 107

Return values

| Return value | Description |
|---|---|
| GPS_SUCCESS | Write done successfully |
| GPS_RTOS_ERROR | An error occurred |

The OS_Storage_WriteAll( ) function uses an operating system or BIOS service to write a GPS data structure to a nonvolatile storage system. The function is called by the GPS engine periodically, for example every 30 seconds, to save time, position and ephemeris information. That information is used later to speed up the GPS start procedure (hot or warm starts)

TABLE 108

| File | | | |
|---|---|---|---|
| gps_rtos.c | | | |
| Syntax | | | |
| tGPS_RESULT OS_Storage_WriteAll( tGPS_UINT8 *data, tGPS_UINT16 length ) | | | |
| Parameter | Data range | Units | Description |
| data | | | Pointer to the data to write |
| length | | bytes | Length of the data |

TABLE 109

Return values

| Return value | Description |
|---|---|
| GPS_SUCCESS | Write done successfully |
| GPS_RTOS_ERROR | An error occurred |

The OS_Storage_Read( ) function uses an operating system or BIOS service to read GPS data structure from a nonvolatile storage system. The function is called by the GPS engine at the startup to retrieve time, position and ephemeris information. This information is used to speed up the GPS start procedure (e.g., for hot or warm starts).

TABLE 110

| File |
|---|
| gps_rtos.c |
| Syntax |
| tGPS_RESULT OS_Storage_Read( tGPS_UINT8 *data, tGPS_UINT16 words ) |

| Parameter | Data range | Units | Description |
|---|---|---|---|
| data | | | Pointer to the data to read |
| words | | 16 bit words | Length of the data |

TABLE 111

| Return values | |
|---|---|
| Return value | Description |
| GPS_SUCCESS | Read done successfully |
| GPS_RTOS_ERROR | An error occurred |

The OS_RTC_Read( ) function uses an operating system or BIOS service to read a real time clock information from the host's RTC. The function is called periodically by the GPS engine.

TABLE 112

| File |
|---|
| gps_rtos.c |
| Syntax |
| tGPS_UINT32 OS_RTC_Read( tGPS_UINT16 *weekno, tGPS_UINT32 *timeOfWeek ) |

| Parameter | Data range | Units | Description |
|---|---|---|---|
| weekno | 1 ... | | GPS full week number |
| timeOfWeek | 0 ... 604799999 | ms | GPS time of the week |

TABLE 113

| Return values | |
|---|---|
| Return value | Description |
| GPS_SUCCESS | Read done successfully |
| GPS_RTOS_ERROR | An error occurred |

The tracker communication interface functions allow messages to be sent and received between the tracker hardware and the user programs and position library.

TABLE 114

| tracker communication interface functions | | |
|---|---|---|
| Function | Description | Implemented in |
| GPS_COMM_TRK_Create( ) | Creates tracker interface port handle | gps_comm_trk.c |
| GPS_COMM_TRK_Delete( ) | Deletes tracker interface port handle | gps_comm_trk.c |
| GPS_COMM_TRK_Open( ) | Opens and configures tracker port | gps_comm_trk.c |
| GPS_COMM_TRK_Reopen( ) | Reopens and/or reconfigures tracker port | gps_comm_trk.c |
| GPS_COMM_TRK_Close( ) | Closes tracker port | gps_comm_trk.c |
| GPS_COMM_TRK_Wait( ) | Waits for data from the tracker | gps_comm_trk.c |
| GPS_COMM_TRK_Read( ) | Reads data from the tracker | gps_comm_trk.c |
| GPS_COMM_TRK_Write( ) | Send commands to the tracker | gps_comm_trk.c |

The GPS_COMM_TRK_Create( ) function uses an OS or BIOS service to create a tracker communication handle. The function is called by the GPS engine at the startup to create a communication handle.

TABLE 115

| File |
|---|
| gps_comm_trk.c |
| Syntax |
| tGPS_UINT32 GPS_COMM_TRK_Create( tGPS_COMM *port_handle ) |

| Parameter | Data range | Units | Description |
|---|---|---|---|
| port_handle | | | Pointer to the communication port handle |

TABLE 116

| Return values | |
|---|---|
| Return value | Description |
| GPS_SUCCESS | Port handle was successfully created |
| GPS_COMM_ERROR | Error creating port handle |

The GPS_COMM_TRK_Delete( ) function uses an OS or BIOS service to delete a tracker communication handle. The function is called by the GPS engine at the stopping procedure to delete a communication handler.

TABLE 117

| File |
|---|
| gps_comm_trk.c |
| Syntax |
| tGPS_UINT32 GPS_COMM_TRK_Delete( tGPS_COMM port_handle ) |

| Parameter | Data range | Units | Description |
|---|---|---|---|
| port_handle | | | Pointer to the communication port handle |

TABLE 118

| Return values | |
|---|---|
| Return value | Description |
| GPS_SUCCESS | Port handle was successfully deleted |
| GPS_COMM_ERROR | An error occurred while deleting port handle |

The GPS_COMM_TRK_Open( ) function uses an OS or BIOS service to open and configure a tracker communication port. The function is called by the GPS engine at the startup.

TABLE 119

File
gps_comm_trk.c
Syntax
tGPS_UINT32 GPS_COMM_TRK_Open( tGPS_COMM port_handle, tGPS_UINT32 port_num, tGPS_UINT32 baud_rate )

| Parameter | Data range | Units | Description |
| --- | --- | --- | --- |
| port_handle | | | Pointer to the communication port handle |
| port_num | | | Specifies a communication port where tracker is connected to. 1 = serial port 1, 2 = serial port 2, ... |
| baud_rate | 4800, 38400, 57600, 115200 | bps | Specifies a baud rate at which tracker is connected to. Default 2t tracker baud rate is 38400 bps. |

TABLE 120

Return values

| Return value | Description |
| --- | --- |
| GPS_SUCCESS | Port was successfully opened |
| GPS_COMM_ERROR | An error occurred while opening or configuring the port |

The GPS_COMM_TRK_Reopen( ) function uses an OS or BIOS service to re-open a tracker communication port. The function is called by the GPS engine after coming back from a power suspend mode. When power suspend mode is not required then the function may return GPS_SUCCESS only.

TABLE 121

File gps_comm_trk.c
Syntax tGPS_UINT32 GPS_COMM_TRK_Reopen( tGPS_COMM port_handle )

| Parameter | Data range | Units | Description |
| --- | --- | --- | --- |
| port_handle | | | Pointer to the communication port handle |

TABLE 122

Return values

| Return value | Description |
| --- | --- |
| GPS_SUCCESS | Port was successfully re-opened |
| GPS_COMM_ERROR | An error occurred |

The GPS_COMM_TRK_Close( ) function uses an OS or BIOS service to close a tracker communication port. The function is called by the GPS engine at the stopping procedure to close the port.

TABLE 123

File gps_comm_trk.c
Syntax tGPS_UINT32 GPS_COMM_TRK_Close( tGPS_COMM port_handle )

| Parameter | Data range | Units | Description |
| --- | --- | --- | --- |
| port_handle | | | Pointer to the communication port handle |

TABLE 124

Return values

| Return value | Description |
| --- | --- |
| GPS_SUCCESS | Port was successfully closed |
| GPS_COMM_ERROR | An error occurred |

The GPS_COMM_TRK_Wait( ) function uses an OS or BIOS services to wait for data from a tracker communication port. The function is called by the GPS engine to wait for the tracker data.

TABLE 125

File gps_comm_trk.c
Syntax tGPS_UINT32 GPS_COMM_TRK_Wait( tGPS_COMM port_handle, tGPS_UINT32 timeout )

| Parameter | Data range | Units | Description |
| --- | --- | --- | --- |
| port_handle | | | Pointer to the communication port handle |
| timeout | 0–4000000000 or GPS_INFINITE | ms | Timeout value |

TABLE 126

Return values

| Return value | Description |
| --- | --- |
| GPS_SUCCESS | Data from tracker is available |
| GPS_COMM_DATA_NOT_AVAILABLE | Error: data from tracker was not available within given time |

The GPS_COMM_TRK_Read( ) function uses appropriate OS or BIOS services to read data from a tracker communication port. The function is called by the GPS engine to read tracker data.

TABLE 127

File gps_comm_trk.c
Syntax tGPS_UINT32 GPS_COMM_Trk_Read(tGPS_COMM port_handle,

TABLE 127-continued tGPS_UINT8 *data,
tGPS_UINT32 length,
tGPS_UINT32 *bytes_read )

| Parameter | Data range | Units | Description |
|---|---|---|---|
| port_handle | | | Pointer to the communication port handle |
| data | | | Pointer to the read data |
| length | 1..65535 | bytes | Number of requested bytes |
| bytes_read | 0..length | bytes | Number of bytes read |

TABLE 128

Return values

| Return value | Description |
|---|---|
| GPS_SUCCESS | Data read was successful |
| GPS_COMM_DATA_NOT_AVAILABLE | An error occurred |

The GPS_COMM_TRK_Write( ) function uses appropriate OS or BIOS services to write data to the tracker communication port. The function is called by the GPS engine to send commands to the tracker hardware.

TABLE 129

| File |
|---|
| gps_comm_trk.c |
| Syntax |
| tGPS_UINT32 GPS_COMM_Trk_Write( tGPS_COMM port_handle, tGPS_UINT8 *data, tGPS_UINT32 length ) |

| Parameter | Data range | Units | Description |
|---|---|---|---|
| port_handle | | | Pointer to the communication port handle |
| data | | | Pointer to the data to send |
| length | 1..65535 | bytes | Number of bytes to send |

TABLE 130

Return values

| Return value | Description |
|---|---|
| GPS_SUCCESS | Data write was successful |
| GPS_COMM_ERROR | An error occurred |

Figure 5:
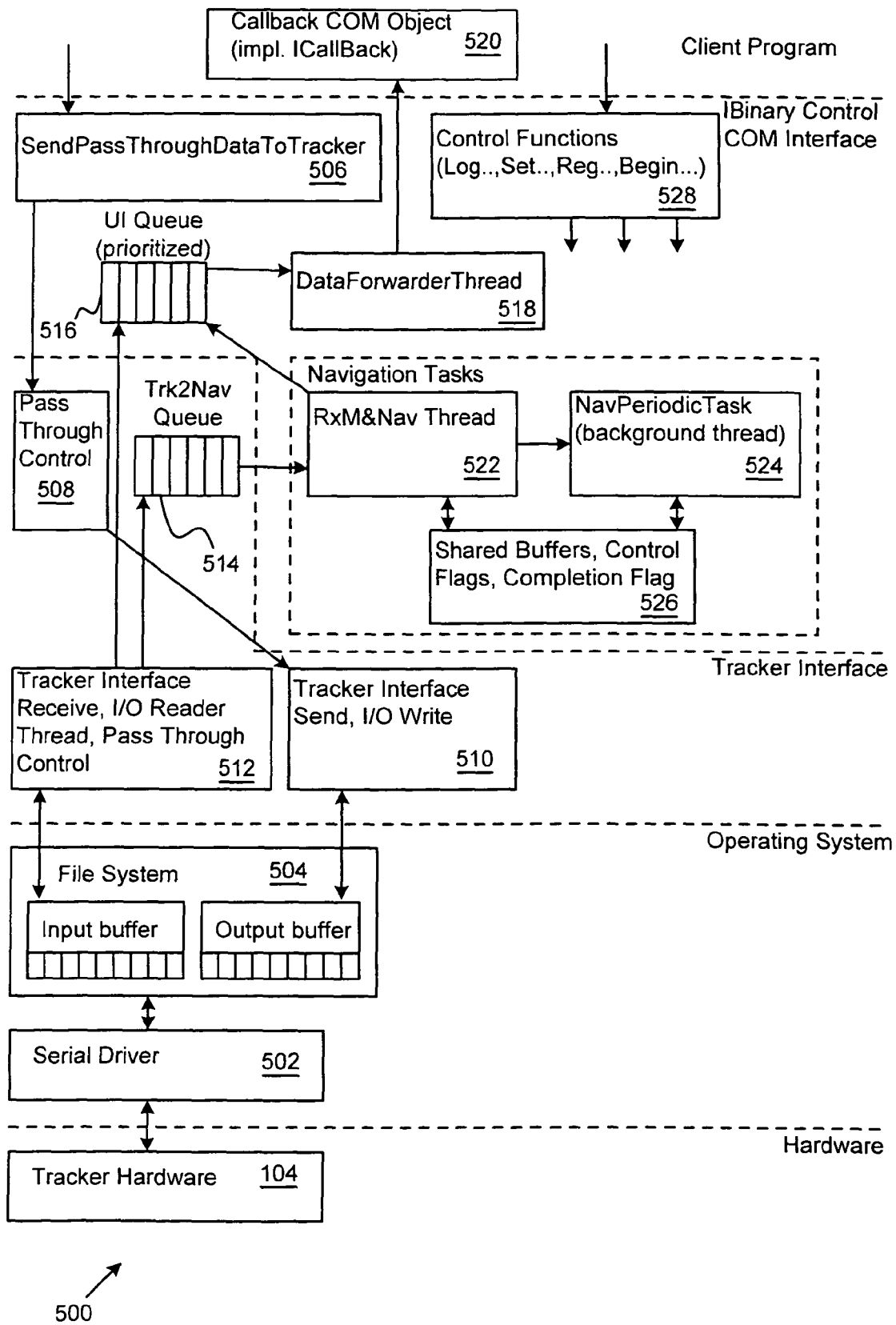
FIG. 5 illustrates a block diagram of the cooperation between threads, tasks and hardware in one implementation of a host based SPS solution.

Turning next to FIG. 5, that figure shows a block diagram 500 of the cooperation between threads, tasks and hardware in one implementation of a host based GPS solution. In particular, the tracker hardware 104 communicates through a serial driver 502 (for example, the Windows CE serial driver). The serial driver 502 communicates and cooperates with a file system 504 (for example, the Windows CE file system), which includes input buffers and output buffers for the communications that will occur.

FIG. 5 shows a pass through data flow path to the tracker hardware 104. The path includes the SendPassThroughData-ToTracker thread 506 that forwards data directly from a client program, through a pass through control function 508 to a tracker interface send function 510. In the reception direction, the tracker interface receive function 512 forwards data from the tracker hardware 104 to the navigation/positioning engine queue 514 (if the message is destined for the positioning engine), or to the user interface queue 516 (if the message is destined directly for the user program). The DataForwarder thread 518 removes messages from the user interface queue 516 and sends them via the user callback function 520 to the user program. When the host 102 includes the Component Object Module interface (available from Microsoft), the user callback function 520 may be the IcallBack function.

The receive manager and navigation thread 522 removes messages destined for the GPS library from the positioning engine queue 514, and also places messages destined for the user programs on the user interface queue 516. The messages for the GPS library are processed by the tasks including the NavPeriodicTask 524. A set of shared buffers, control flags, completion flags, and the like 526 are maintained by the GPS library. Finally, it is noted that the COM interface provides a set of control functions 528.

Figure 6:
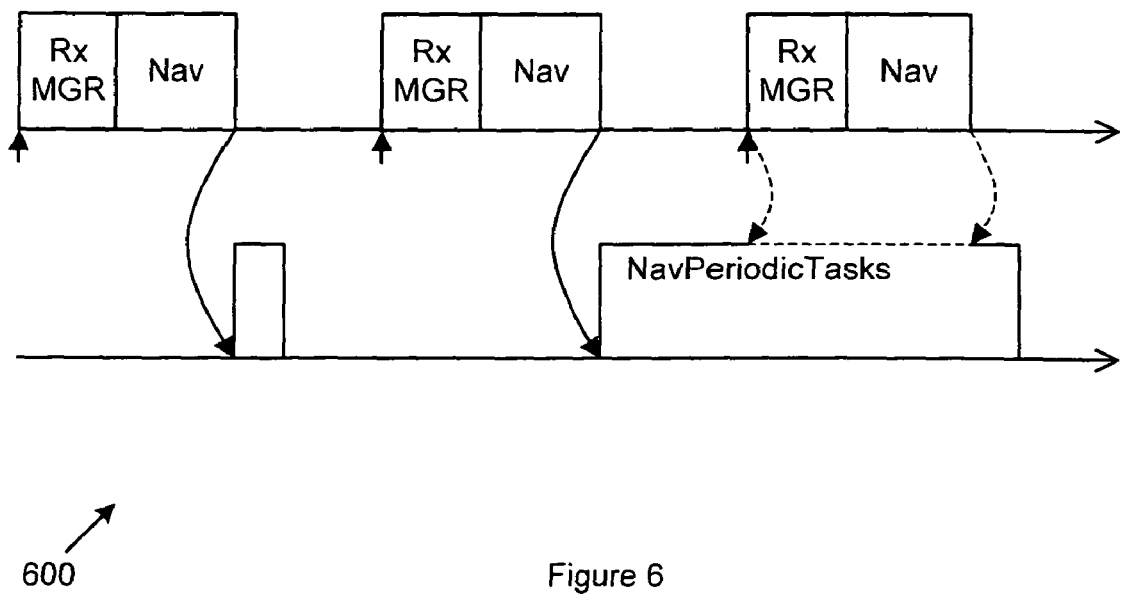
FIG. 6 illustrates an execution schedule for a receive manager thread and a periodic navigation task.

Turning next to FIG. 6, that figure illustrates one execution schedule 600 for the receive manager thread 522 and the NavPeriodicTask 524. In the schedule 600, the NavPeriodicTask 524 runs as a low-priority (background) thread, while the receiver manager and navigation thread 522 run in one normal-priority thread.

Figure 7:
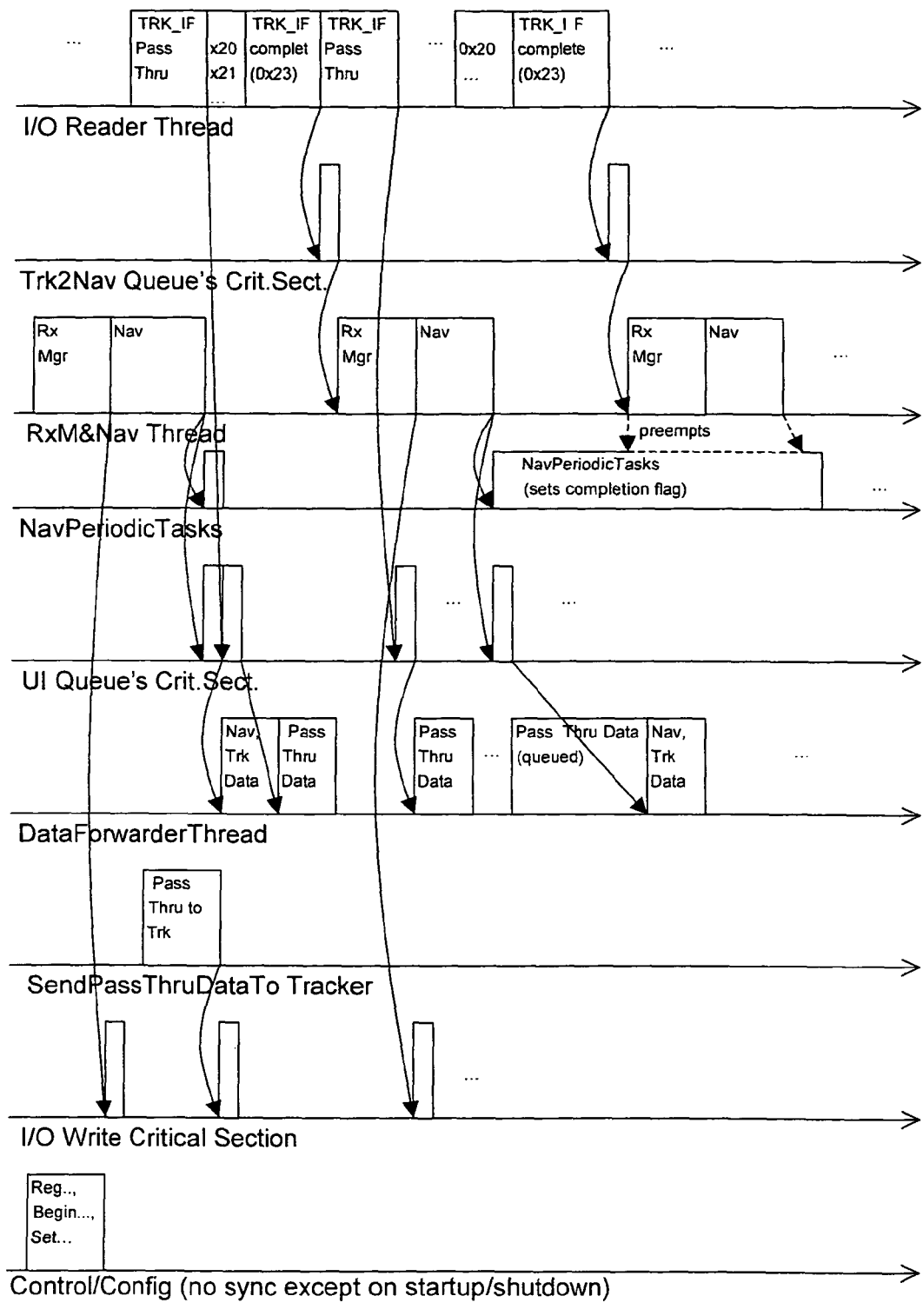
FIG. 7 illustrates a synchronization diagram for the timing and interaction between the threads and tasks shown in FIG. 5.

With regard to FIG. 7, that figure shows a synchronization diagram 700. The synchronization diagram 700 illustrates the timing and interaction between the threads and tasks shown in FIG. 5.

With reference to FIG. 7, receive manager (RxM) and navigation (Nav) run sequentially in one loop that waits for new data from Tracker Interface (TRK_IF) Receiver before each iteration. Either RxM or Nav may signals NavPeriodicTask 524 to proceed with one iteration of its loop (unless NavPeriodicTask 524 already performing its task, in which case it will finish the task and skip one loop).

The RxM and Nav thread 522 may wait on a Critical Section when writing data to the UI Queue 516, or when sending data to Tracker 104. There will typically be a thread running while RxM&Nav are waiting. In one implementation, NavPeriodicTasks 524 runs at smaller priority than the other tasks and it will not run as long as any other thread is running. In an alternative implementation, NavPeriodicTasks 524 runs at normal priority, but does not present a conflict as long as RxM&Nav have sufficient priority to consume data generated by NavPeriodicTasks 524.

The RxM and Nav thread 522 runs the RxM control task that maintains a state machine for the Rx and manages the state machine transitions based on current state. The RxM communicates with the tracker hardware 104 through the tracker interface. It both sends data and commands to the tracker hardware 104 to pace it through initial acquisition and tracking of SPS satellites, and receives data and status messages from the receiver with raw SPS satellite tracking data. The primary purpose of the RxM task is to manage and control the operation of the tracker hardware 104. It also preprocesses the raw tracker data and submits the processed data to the Navigation Processing Task. The RxM gets scheduled or called by the Nav Task once the tracker hardware 104 starts tracking.

The NavPeriodicTasks thread 524 is a pseudo task that performs miscellaneous support operations for the RxM and Nav tasks. Its functions include determining and performing updates to the satellite state tables, and generating new visible SPS satellite list when new ephemeris data is collected, or whenever it is requested.

The Nav Processor Thread performs position, velocity and time computations based on the RxM generated individual SPS satellite data. This makes use of the functionality offered through the navigation library in optimally computing the navigation position data. The computed navigation data is made available to the Data Forwarding thread. At the beginning of each iteration, the Nav Processor calls or schedules the RxM task to run, and then it performs navigation computations and generates the user position, velocity, and time data. Based on the computation results, if pre-selected error thresholds are exceeded, the Nav Processor may send commands to the receiver, either directly or through the RxM, to force the receiver to reset.

The I/O Reader thread and Tracker Interface Receiver 512 sends data to queues as shown in FIG. 5. In addition, data length error checks may be performed with error counts logged in a global variable. Erroneous message bytes will be reported to the user program through debug messages.

Note that in some implementations, the I/O Writer thread 510 is not used. Instead, its role may been taken by TRK_IF, whose methods are invoked from the RxM+Nav thread 522 and SendPassThruDataToTracker 504. TRK_IF writes directly to the serial port. (All I/O functions will be grouped into one class). In WinCE, buffering is performed on the File System level, which allows TRK_IF to return quickly upon sending data. On Nucleus, additional buffering may be provided.

The DataForwarderThread 518 reads from the UI Queue 516 and calls the user program's ICallBack interface for each binary message to be sent. If the UI queue's Semaphore is still signaled after Callback returns, the DataForwarderThread 518 may continue piping data until the UI queue 516 is empty. In one implementation, the UI Queue 516 is not locked while Callback is being executed, which allows other threads to run while waiting for Callback to return. Client Callback typically puts data in internal storage for another thread to use. Generally, one Callback is called at a time. The UI Queue 516 is prioritized and it will put pass-thru messages before all others in the queue.

The SendPassThruDataToTracker function 506 is an API call for sending pass-thru messages from the user program to the tracker hardware 104. Note that the pass through control function 504 may be implemented as a filter to enable or disable pass-thru messages.

A Shutdown may be performed by purging all queues and I/O. For example, 300 ms (enough for RxM&Nav to complete) may then be given for threads to complete. Although some threads may not complete in that time, such as the DataForwarderThread 518 (that may be waiting for Callback to return), and NavPeriodicTask 524, for which there may or may not be a provision to interrupt long-term calculations. Regardless, threads which do not complete on time are terminated.

The following synchronization objects may be used: a Semaphore and Critical Section in UI Queue 516 for triggering UI output, a Semaphore and Critical Section in Trk2Nav Queue 514 for triggering Nav update, a Positioning/Navigation Library sync flag (from NavPeriodTasks to RxM and Nav), and a shutdown semaphore and flag. Note that the Critical Section(s) in the Tracker Interface are for protecting access to the serial port.

Queues may have the following API and features: Constructor/destructor, void *GetBuffer(int priority, long size) to obtain a pre-allocated buffer for Put( ), void Put( ) to queues the buffer with specified priority, void *BeginGet( ) to waits until data ready or shutdown, void EndGet( ), void Remove( ), void Purge( ) to cancel all BeginGet calls, an internal Semaphore for notifying BeginGet( ) when data is ready, and an internal Critical Section.

With regard to error checking, all queue overruns, I/O errors, timeouts and COM errors may optionally be reported to client, packaged in debug messages, UI queue 516 overruns will be reported as an error to user program, Tracker message time-outs may be handled by Nav, and Trk2Nav Queue 514 overruns may be signaled to RxM and Nav.

It is further noted that the Windows registry may provide a mechanism for configuring thread priorities (that may, for example, be set once at startup and remain unchanged during execution), I/O buffer sizes, and queue sizes. Note that the SetupComm( ) function may be used to increase the size of existing WinCE I/O buffers. Doing so prevents input data loss under stress conditions. This may also be configurable through registry, and default values may be chosen to accommodate several seconds of I/O (e.g., 4 kb for input and 1 kb for output).

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A system for processing positioning signals, the system comprising;
   a tracker hardware interface configured to receive positioning information including raw GPS positioning data;
   a memory comprising a GPS library comprising a user interface, a tracker interface, and an operating system interface, the tracker interface comprising at least one tracker interface function for communicating over the tracker hardware interface and the user interface comprising at least one user interface function associated with a restart mode; and
   a processor configured to execute the tracker interface function by transmitting the raw GPS positioning data to a positioning engine configured to determine a position from the positioning data;
   wherein the positioning engine is configured to execute on the processor separately from a user program that executes on the processor, the user program displaying location information derived from the raw GPS positioning data.

2. The system of claim 1, wherein the tracker hardware interface comprises a serial interface.

3. The system of claim 1, wherein the user interface comprises at least one positioning control function and at least one positioning engine communication function.

4. The system of claim 3, wherein the positioning control function comprises a positioning engine start function.

5. The system of claim 3, wherein the positioning control function comprises a positioning engine stop function.

6. The system of claim 3, wherein the positioning engine communication function is a command delivery function.

* * * * *